(12) United States Patent
Eylem et al.

(10) Patent No.: US 7,972,726 B2
(45) Date of Patent: Jul. 5, 2011

(54) PRIMARY ALKALINE BATTERY CONTAINING BISMUTH METAL OXIDE

(75) Inventors: Cahit Eylem, Bellingham, MA (US); Paul A. Christian, Norton, MA (US); Yichun Wang, West Roxbury, MA (US); Joseph E. Sunstrom, IV, Merrimack, NH (US); In Tae Bae, Wrentham, MA (US)

(73) Assignee: The Gillette Company, Boston, MA (US)

( * ) Notice: Subject to any disclaimer, the term of this patent is extended or adjusted under 35 U.S.C. 154(b) by 1297 days.

(21) Appl. No.: 11/484,550

(22) Filed: Jul. 10, 2006

(65) Prior Publication Data
US 2008/0008937 A1  Jan. 10, 2008

(51) Int. Cl.
*H01M 4/48* (2010.01)
*H01M 4/50* (2010.01)
*H01M 4/54* (2010.01)
*H01M 4/52* (2010.01)
*H01M 2/16* (2010.01)

(52) U.S. Cl. .............. 429/218.1; 429/224; 429/223; 429/219; 429/231.6; 429/221; 429/220; 429/231.1; 429/145

(58) Field of Classification Search .................. None
See application file for complete search history.

(56) References Cited

U.S. PATENT DOCUMENTS

| | | | |
|---|---|---|---|
| 2,809,225 A | 10/1957 | Morehouse et al. |
| 2,828,350 A | 3/1958 | Rhyne, Jr. |
| 3,415,687 A | 12/1968 | Methlie, II |
| 3,822,148 A | 7/1974 | Dey et al. |
| 3,853,627 A | 12/1974 | Lehmann et al. |
| 4,085,259 A | 4/1978 | Lauck |
| 4,113,929 A | 9/1978 | Margalit |
| 4,158,723 A | 6/1979 | Gabano et al. |
| 4,184,016 A | 1/1980 | Lecerf |
| 4,229,509 A | 10/1980 | Margalit |
| 4,233,374 A | 11/1980 | Lecerf |
| 4,247,610 A | 1/1981 | Thornton |
| 4,268,588 A | 5/1981 | Lecerf et al. |
| 4,271,243 A | 6/1981 | Broussely et al. |
| 4,309,491 A | 1/1982 | Brec et al. |
| 4,444,857 A | 4/1984 | Duchange et al. |
| 4,777,100 A | 10/1988 | Chalilpoyil et al. |
| 4,804,597 A | 2/1989 | Tahara et al. |
| 5,026,617 A | 6/1991 | Kosaka et al. |
| 5,302,475 A | 4/1994 | Adler et al. |
| 5,368,957 A | 11/1994 | Kozmik et al. |
| 5,389,469 A | 2/1995 | Passaniti et al. |
| 5,589,109 A | 12/1996 | Passaniti et al. |

(Continued)

FOREIGN PATENT DOCUMENTS
EP  0 127 134  12/1984
(Continued)

OTHER PUBLICATIONS

Macquart et al., "Synthesis and Structural Studies of the A-Site Substituted Bismuth Double Perovskites, $Ba_{2-x}Sr_xLuBiO_6$," Chem. Mater., vol. 17, pp. 1905-1909, 2005.

(Continued)

*Primary Examiner* — Barbara L. Gilliam
*Assistant Examiner* — Angela J. Martin
(74) *Attorney, Agent, or Firm* — Fish & Richardson P.C.

(57) ABSTRACT

Primary alkaline batteries containing pentavalent bismuth metal oxides are disclosed.

16 Claims, 11 Drawing Sheets

U.S. PATENT DOCUMENTS

| | | | |
|---|---|---|---|
| 5,658,688 | A | 8/1997 | Jolson |
| 5,681,672 | A | 10/1997 | Lee et al. |
| 5,780,186 | A | 7/1998 | Casey, Jr. |
| 5,798,180 | A | 8/1998 | Chowdhury et al. |
| 5,910,366 | A | 6/1999 | Chowdhury et al. |
| 5,952,124 | A | 9/1999 | Kainthla et al. |
| 6,001,508 | A * | 12/1999 | Passaniti et al. ............... 429/219 |
| 6,284,410 | B1 | 9/2001 | Durkot et al. |
| 6,358,651 | B1 | 3/2002 | Chen et al. |
| 6,472,103 | B1 | 10/2002 | Durkot et al. |
| 6,509,117 | B1 | 1/2003 | Bowden et al. |
| 6,521,378 | B2 | 2/2003 | Durkot et al. |
| 6,613,703 | B1 | 9/2003 | Yahiaoui et al. |
| 6,682,854 | B2 | 1/2004 | Cheiky et al. |
| 6,706,442 | B1 | 3/2004 | Sakamoto et al. |
| 6,926,999 | B2 | 8/2005 | Tanoue et al. |
| 6,991,875 | B2 | 1/2006 | Christian et al. |
| 7,069,203 | B2 | 6/2006 | Wollenberg et al. |
| 7,081,319 | B2 | 7/2006 | Christian et al. |
| 7,247,407 | B2 | 7/2007 | Durkot et al. |
| 7,273,680 | B2 | 9/2007 | Durkot et al. |
| 7,300,722 | B2 | 11/2007 | Christian et al. |
| 7,407,726 | B2 | 8/2008 | Wang et al. |
| 7,537,863 | B2 | 5/2009 | Eylem et al. |
| 2003/0082450 | A1 | 5/2003 | Tanoue et al. |
| 2003/0186125 | A1 | 10/2003 | Shimakawa et al. |
| 2004/0121235 | A1 | 6/2004 | Amatucci |
| 2005/0058902 | A1 | 3/2005 | Wang et al. |
| 2005/0058903 | A1 | 3/2005 | Eylem et al. |
| 2005/0079424 | A1 | 4/2005 | Davis et al. |
| 2005/0084761 | A1 | 4/2005 | Hennige et al. |
| 2005/0227145 | A1 | 10/2005 | Iwamoto et al. |
| 2006/0046135 | A1 | 3/2006 | Huang |
| 2006/0074594 | A1 | 4/2006 | Ceder et al. |
| 2006/0228629 | A1* | 10/2006 | Christian et al. ........... 429/231.1 |
| 2007/0190414 | A1 | 8/2007 | Amatucci et al. |
| 2008/0008937 | A1 | 1/2008 | Eylem et al. |

FOREIGN PATENT DOCUMENTS

| | | |
|---|---|---|
| EP | 0 751 241 A1 | 1/1997 |
| GB | 2202670 | 9/1988 |
| JP | 55/111067 | 8/1980 |
| JP | 56/159067 | 12/1981 |
| JP | 58/001971 | 1/1983 |
| JP | 58/048357 | 3/1983 |
| JP | 04/002020 | 7/1992 |
| JP | 52/12425 | 8/1993 |
| JP | 6310116 A | 11/1994 |
| WO | WO 2006/017454 | 2/2006 |
| WO | WO 2005/034267 A2 | 10/2006 |
| WO | WO 2006/110354 | 10/2006 |

OTHER PUBLICATIONS

Vensky et al., "The real structure of $Na_3BiO_4$ by electron microscopy. HR-XRD and PDF analysis" Kristallogr. vol. 220, pp. 231-244, 2005.

Sharma et al., "Synthesis and characterization of $AgBiO_3$ with the cubic $KSbO_3$ structure", Indian Journal of Chemistry, vol. 43A, pp. 11-17, Jan. 2004.

Martin-Gonzalez et al., "$Sr_{18}Ru_{1.9}O_{33}$: crystallization of a Ru(V)/Bi(V) oxide from molten hydroxide", Journal of Solid State Chemistry, vol. 173, pp. 203-208, 2003.

Mizoguchi et al., "Optical and electrical properties of the wide gap, n-type semiconductors: $ZnBi_2O_6$ and $MgBi_2O_6$" Chem. Commun., vol. 9, pp. 1084-1085, 2003.

Oberndorfer et al., "Ein neuer Zugang zu Silberbismutaten", Z. Anorg. Allig. Chem., vol. 628, pp. 1951-1954, 2002 (English Abstract Only).

Kazin et al., "Synthesis and Crystal Structure of $Sr_2ScBiO_6$", Journal of Solid State Chemistry, vol. 162, pp. 142-147, 2001.

Fu et al., "Structural and transport properties of the $BaB1_{1-x}O_3$ system", Materials Research Bulletin, vol. 35, pp. 1205-1211, 2000.

Puckhaber et al., "Laser Diffraction: Millennium-Link for Particle Size Analysis", Powder Handling & Processing, vol. 11, No. 1, 1999.

Kacehob et al., "Evaluation of Thermodynamic Properties of Alkali Metal Bismuthatates", Zhurnal Fizicheskoi Khimii, vol. 71, No. 6, pp. 1146-1148, 1997 (No English Version/Translation).

Harrison et al., "Syntheses, Structures, and Magnetism of Barium/Rare-Earth/Bismuth Double Perovskies. Crystal Structures of $Ba_2MBiO_6$ (M=Ce, Pr, Nd, Tb, Yb) by Powder Neutron Diffraction", Chem. Mater., Vol. 7, pp. 2161-2167, 1995.

Laligant et al., "Synthesis and Crystal Structure of $Li_8Bi_2PdO_{10}$ Determined Ab Initio from X-ray Powder Diffraction Data", Eur. J. Solid State Inorg. Chem., vol. 30, pp. 689-698, 1993.

Uma et al., "Synthesis of Novel Oxide Pyrochlores, $A_2BB'O_7$ (A=La, Nd: BB'=Pb, Sn, Bi), by Alkali Melt Route", Journal of Solid State Chemistry, vol. 105, pp. 595-598, 1993.

Nguyen, "Electrosynthesis of $KBiO_3$: A Potassium Ion Conductor with the $KSbO_3$ Tunnel Stucture", Chem. Mater., vol. 5, pp. 1273-1276, 1993.

Bortz et al., "$Ag_{25}Bi_3O_{18}$, ein gemischtvalentes Bismutat", Z. anorg. Allg. Chem., vol. 612, pp. 113-117, 1992 (English Abstract Only).

Carlson et al., "Six New Bi(V) Materials: $LiSr_3BiO_6$, $NaSr_3BiO_6$, $NaBa_3BiO_6$, $Li_6KBiO_6$, $Li_6RbBiO_6$, and $Li_2Ba_5Bi_2O_{11}$" Journal of Solid State Chemistry, vol. 96, pp. 332-343, 1992.

Kodialam et al., "Electrodeposition of Potassium Bismuthate: $KBiO_3$", Mat. Res. Bull., vol. 27, pp. 1379-1384, 1992.

Byeon, "High-pressure synthesis and characterization of ordered cubic perovskite $Ba_2Bi(V)Fe(III)O_6$" Materials Letters, vol. 12, pp. 163-167, 1991.

Hübenthal et al., "The First Quarternary Oxobismuthate(V): $KLi_6BIo_6$", Ada Chemica Scandinavica, vol. 45, pp. 805-811, 1991.

Lenz et al., "$Bi^{5+}$ Monoklin Verzerreten Perowskit $Sr_2BiNdO_6$", Journal of the Less-Common Metals, vol. 161, pp. 141-146, 1990 (English Abstract Only).

Greaves et al., "The Structural Chemistry of $Li_3Zn_2Mo_6$ (M=Sb, Bi) and Related Phases", Mat. Res. Bull., vol. 25, pp. 1175-1182, 1990.

Jones et al., "Superconductivity at 34 K in the K/Ba/Bi/O System", Journal of Solid State Chemistry, vol. 78, pp. 319-321, 1989.

Norton, "Electrodeposition of $Ba_6K_4BiO_3$", Mat. Res. Bull., vol. 24, pp. 1391-1397, 1989.

Greaves et al., "The Structures of $Li_5BiO_5$ and $Li_5SbO_5$ from Powder Neutron Diffraction", Mat. Res. Bull., vol. 24, pp. 973-980, 1989.

Nomura et al., "Brief Communication, Ionic Conductivity of $Li_7BiO_6$" Journal of Solid State Chemistry, vol. 52, pp. 91-93, 1984.

Ramanan et al., Perovskite and weberite-related phases in the Na-Ln-Bi-O system (Ln=La, Nd, Gd or Y)[(*)], Revue de Chimie minerale, vol. 19, pp. 225-230, 1982.

Knop, "Pyrochlores. XI. High-pressure studies of the anitmonates $A_2Sb_2O_7$ (A=Ca, Sr, Cd) and preparation of the weberite $Sr_2Bi_2O_7$'", Can. J. Chem., vol. 58, pp. 2221-2224, 1980.

Cox et al., "Crystal Structure of $Ba_2Bi^{3+}Bi^{5+}O_6$", Solid State Communications, vol. 19, pp. 969-973, 1976.

Sleight et al., "High-Temperature Superconductivity in the $BaPb_{1-x}Bi_xO_3$ System".

Antipov et al., "The Superconducting Bismuth-based Mixed Oxides", Journal of Low Temperature Physics, vol. 131, Nos. 3/4, May 2003.

Apostolova et al., "Study of Bismuth-containing Oxide Compounds as Cathode Materials for Lithium Batteries", Russian Journal of Applied Chemistry, vol. 72, No. 8, pp. 1377-1380, 1999.

Arroyo et al., "$Bi_4V_2O_{11}$ and related compounds as positive electrode materials for lithium rechargeable batteries", Solid State Ionics, 91, pp. 273-278, 1996.

Arroyo et al., "From $Bi_4V_2O_{11}$ to $Li_{28}B_4V2O_{11}$ by electrochemical lithium insertion: versatile applications in lithium batteries", International Journal of Inorganic Materials, 1, pp. 83-86, 1999.

Bervas et al., "Carbon Bismuth Oxyfluoride Nanocomposites as Cathode Material for Lithium Battery", Abs. 419, 206th Meeting, Electrochemical Society, 2004.

Blasse, "On the Structure of some Compounds $Li_3Me^5+O_4$ and some other Mixed Metal Oxides Containing Lithium", Zeitschrift fur anorganishe und allegemeine Chemie Band 331, pp. 44-5 1 , 1964.

Broussely et al., "Lithium-Bismuth Metal Oxide Cells", Lithium Batteries, pp. 97-114, 1983.

Cox, "Mixed-Valent $Ba^2Bi^{3+}Bi^{5+}O6$:Structure and Properties vs. Temperature", Acta Cryst., B35, pp. 1-10, 1979.

Deibele et al., "Bismusth in $Ag_2BiO_3$:Tetravalent or Internally Disproportionated", Journal of Solid State Chemistry, 147, pp. 117-121, 1999.

Fiordiponti et al., "Behavior of $Bi_2O_3$ as a Cathode for Lithium Cells", Journal of the Electrochemical Society, pp. 14-17.

Jain et al., "Nanosized Amphorous Iron Oxyhydroxide for Reversible Lithium Intercalation", Journal of the Electrochemical Society, 150, (6), pp. A806-A810, 2003.

Kinomura et al., "Preparation of Bismuth Oxides with Mixed Valence from Hydrated Sodium Bismuth Oxide", Materials Research Bulletin, pp. 129-134, vol. 30, No. 2, Feb. 1995.

Kinoshita, "Properties of Bismuth Oxide as an Active Material of Negative Electrode in Alkaline Storage Cell", Bull. Chem. Soc., Japan, pp. 59-65, 1940.

Kumada et al., "Crystal Structure of $Bi_2O_4$ with $\beta$-$Sb_2O_4$-Type Structure", Journal of Solid State Technology, pp. 281-285, vol. 116, No. 2, May 1995.

Kumada et al., Ion-exchange reaction of $Na^+$ in $NabiO_3$ '$nH_2O$ with $Sr^{2+}$ and $Ba^{2+}$, Solid State Ionics, 122, pp. 183-189, 1999.

Kumada et al., "Neutron Powder Diffraction Refinement of Ilmenite-Type Bismuth Oxides: $AbiO_3$ (A=Na, Ag)", Materials Research Bulletin, pp. 2397-2402, vol. 35, No. 14/15, Nov. 2000.

Kumada et al., "Preparation and Crystal Structure of a New Lithium Bismuth Oxide: $LiBiO_3$", Journal of Solid State Chemistry, 126, pp. 121-126, 1996.

Kumada et al., "Preparation of $ABi_2O_6$ (A=Mg, Zn) with the Trirutile-type Structure", Materials Research Bulletin, vol. 32, No. 8, pp. 1003-2008, 1997.

Kumada et al., "Preparation of New Bismuth Oxides by Hydrothermal Reaction", Mat. Res. Soc. Symp. Proc., vol. 658, pp. GG8.71-GG8.76, 2001.

Kumada et al., "Synthesis of New Ilmenite-Type Oxides, AgMO (M=Sb,Bi) by Ion-Exchange Reaction", Advances in Ion Exchange for Industry and Research, pp. 212-217, 1999.

Latimer "The Oxidation States of the Elements and Their Potentials in Aqueous Solutions", 2nd ed., Prentice-Hall, New York, pp. 122-123, 1952.

Lazure et al., "Composition dependence of oxide anion conduction in the BIMEVOX family". Solid State Ionics, 90, pp. 117-123, 1996 (Abstract only).

Linden in "Handbook of Batteries and Fuel Cells", Handbook of Batteries and Fuel Cells, pp. 11-79-11-81, 1984.

Liu et al., "Synethesis of superconducting $Ba_{1-x}K_xBiO_3$ by a modified molten salt process". Materials Research Bulletin, 36, pp. 1505-1512, 2001.

Lovrecek et al., "Monographs in Electroanalytical Chemistry and Electrochemistry", Standards Potential in Aqueous Solution, pp. 180-187, 1985.

Mergen et al., "Crystal Chemistry, Thermal Expansion and Dielectric Properties of $(Bi_{1.5}Zn_{0.5})O_7$ Pyrochlore", Materials Research Bulletin, pp. 175-189, vol. 32, No. 2, Jan. 1997.

Murphy et al., "Topochemical Reactions of Rutile Related Structures with Lithium", Mat. Res. Bull. vol. 13, pp. 1395, 1402, 1978.

Muylder et al., "Bismuth", Cebelcor, pp. 534-539, 1957.

Oberndorfer et al., "A New Approach to Silverbusmuthates", Z. Anorg. Allg. Chem., 628. pp. 1951-1954, 2002 (English Abstract Only).

Pasquali et al., "Primary 1.5 Lithium Cells with $ViVO_4$ Cathodes", Journal of Power Sources, 27, pp. 29-34, 1989.

Passaniti et al., "Silver Oxide Cells", Handbook of Batteries, pp. 12.1-12.16, 1995.

Patoux et al., "Lithium- and Proton-Driven Redox Reactions in BIMEVOX-Type Phases", Chem. Mater., 13, 500-7, 2001.

Pistoia et al., "Button Cells Based on the $Li/Bi_2O_3$ Couple", Journal of Power Sources, 16, pp. 263-269, 1985.

Rodriguez et al., "Electrochemical study of the reaction of lithium with Aurivillius and related phases", Material Research Bulletin, 36, pp. 1195-1204, 2001.

Scholder et al., "Alkali and alkaline and earth bismuthates", Zeitschrift fur anorganishe und allegemeine Chemie Band 319, pp. 375-386, 1963 (English Abstract Only).

Scholder et al., "On Bismuthates", Zeitschrift fur anorganishe und allegemeine Chemie 247, pp. 392-415, 1941 (English Translation).

Sharma et al., Synthesis and characterization of $AgBiO_3$ with the cubic $KSbO_3$ structure, Indian Journal of Chemistry, vol. 43A, pp. 11-17, Jan. 2004.

Takeuchi et al., "The Reduction of Silver Vanadium Oxide in Lithium/Silver Vanadium Oxide Cells", J. Electrochem. Soc.: Electrochechemical Science and Technology, vol. 135. No. 11. pp. 2691-2694, 1988.

Trehoux et al., Synthese et Caracterisation de Nouvelles Phases due Diagramme (K Ou Na)—Bi—O, Mat. Res. Bull, vol. 17, pp. 1235-1243, 1982 (French Only).

Wang et al., U.S. Appl. No. 10/716,358, "Primary Alkaline Battery Containing Bismuth Metal Oxide", Nov. 17, 2003.

Pan et al., "Preparation of $NaBiO_3$ and the electrochemical characteristic of manganese dioxide doped with $NaBiO_3$", Electrochemicta Acta, vol. 51, pp. 3118-3124, 2006.

* cited by examiner

FIG. 2

| Active Cathode Material | No. e per formula unit | Theoret. Specific Capacity (mAh/g) | Ave CCV (V) | Density (g/cm$^3$) | Theoret. Volumetric Capacity (Ah/cm$^3$) | Theoret. Energy Density (Wh/cm$^3$) |
|---|---|---|---|---|---|---|
| β-NiOOH | 1 | 292 | 1.55 | 4.10 | 1.20 | 1.86 |
| EMD | 1 | 307 | 1.23 | 4.45 | 1.37 | 1.68 |
| Ag$_2$O | 2 | 231 | 1.55 | 7.14 | 1.65 | 2.56 |
| LiBiO$_3$ | 2 | 203 | 1.65 | 7.56 | 1.54 | 2.54 |
| KBiO$_3$ | 2 | 181 | 1.60 | 5.87 | 1.06 | 1.70 |
| AgBiO$_3$ | 3 | 220 | 1.55 | 8.18 | 1.81 | 2.80 |
| Ag$_2$BiO$_3$ | 3 | 170 | 1.40 | 8.69 | 1.48 | 2.07 |
| Ag$_2$BiO$_{3.5}$ | 4 | 223 | 1.35 | 8.67 | 1.93 | 2.61 |
| MgBi$_2$O$_6$ | 4 | 199 | 1.67 | 7.92 | 1.58 | 2.64 |
| ZnBi$_2$O$_6$ | 4 | 185 | 1.65 | 8.44 | 1.56 | 2.57 |
| SrBi$_2$O$_6$ | 4 | 178 | 1.65 | 7.01 | 1.25 | 2.06 |
| Ag$_3$BiO$_{3.5}$ | 4 | 182 | 1.40 | 8.65 | 1.57 | 2.20 |
| Ag$_3$BiO$_4$ | 5 | 225 | 1.45 | 8.60 | 1.93 | 2.80 |
| Ag$_7$BiO$_6$ | 9 | 227 | 1.50 | 8.26 | 1.88 | 2.82 |

FIG. 3

| Ex. No. | Cathode Material (CoOOH-coated) | Grav. Capacity, 10 mA/g (mAh/g) | Volum. Capacity, 10 mA/g (Ah/cm³) | % Utilization | Grav. Capacity, 140 mA/g (mAh/g) | Volum. Capacity 140 mA/g (Ah/cm³) | % Utilization |
|---|---|---|---|---|---|---|---|
| 10 | hexag-AgBiO$_3$ | 170 | 1.39 | 77 | 156 | 1.27 | 71 |
| 9 | cubic-AgBiO$_3$ | 190 | 1.55 | 86 | 175 | 1.43 | 80 |
| 5 | *cubic-AgBiO$_3$ | 206 | 1.61 | 94 | 187 | 1.46 | 85 |
| 11 | *Ag$_3$BiO$_3$ | 147 | 1.27 | 100 | 125 | 1.08 | 91 |
| 12 | *Ag$_2$BiO$_3$ | 173 | 1.50 | 100 | 154 | 1.34 | 90 |
| 13b | *Ag$_2$BiO$_{3+\delta}$ | 189 | 1.64 | 85 | --- | --- | -- |
| 13a | *Ag$_3$BiO$_{3+\delta}$ | 173 | 1.50 | 82 | --- | --- | -- |
| 14 | *Ag$_{7.5}$BiO$_6$ | 213 | 1.83 | 93 | --- | --- | -- |
| --- | ZnBi$_2$O$_6$ | 95 | 0.80 | 51 | 52 | 0.44 | 28 |
| 2 | MgBi$_2$O$_6$ | 154 | 1.07 | 77 | 135 | 0.96 | 68 |
| --- | SrBi$_2$O$_6$ | 89 | 0.62 | 50 | 67 | 0.47 | 38 |
| 8 | LiBiO$_3$ | 118 | 0.78 | 58 | 66 | 0.50 | 33 |
| --- | KBiO$_3$ | 105 | 0.61 | 58 | 70 | 0.41 | 39 |
| C2 | EMD | 287 | 1.28 | 93 | 182 | 0.81 | 59 |
| C1 | β-NiOOH | 220 | 0.90 | 75 | 196 | 0.80 | 67 |

* = uncoated

| Ex. No. | % AgBiO$_3$ (w/w) | % EMD (w/w) | Grav. Capacity, 10 mA/g (mAh/g) | Volum. Capacity, 10 mA/g (Ah/cm$^3$) | Grav. Capacity, 140 mA/g (mAh/g) | Volum. Capacity, 140 mA/g (Ah/cm$^3$) |
|---|---|---|---|---|---|---|
| 5  | 100 | 0   | 200 | 1.635 | 183 | 1.480 |
| 6a | 90  | 10  | 221 | 1.682 | 182 | 1.390 |
| 6b | 75  | 25  | 242 | 1.714 | 178 | 1.264 |
| 6c | 50  | 50  | 281 | 1.744 | 176 | 1.094 |
| 6d | 25  | 75  | 329 | 1.756 | 174 | 0.927 |
| 6e | 10  | 90  | 351 | 1.686 | 175 | 0.842 |
| 6f | 5   | 95  | 332 | 1.530 | 170 | 0.785 |
| 6g | 1   | 99  | 301 | 1.350 | 177 | 0.794 |
| C2 | 0   | 100 | 287 | 1.280 | 182 | 0.880 |

| Ex. No. | % MgBi$_2$O$_6$ (w/w) | % NiOOH (w/w) | Grav. Capacity, 10 mA/g (mAh/g) | Volum. Capacity, 10 mA/g (Ah/cm$^3$) | Grav. Capacity, 140 mA/g (mAh/g) | Volum. Capacity, 140 mA/g (Ah/cm$^3$) |
|---|---|---|---|---|---|---|
| 2 | 100 | 0 | 150 | 1.02 | 135 | 0.91 |
| 3a | 83 | 17 | 162 | 1.03 | 150 | 0.94 |
| 3b | 67 | 33 | 180 | 1.05 | 161 | 0.94 |
| 3c | 50 | 50 | 182 | 0.98 | 167 | 0.90 |
| 3d | 33 | 67 | 189 | 0.94 | 183 | 0.91 |
| 3e | 17 | 83 | 209 | 0.95 | 200 | 0.91 |
| C1 | 0 | 100 | 223 | 0.91 | 212 | 0.88 |

| Ex. No. | % NaBiO$_3$ (w/w) | % EMD (w/w) | Grav. Capacity, 10 mA/g (mAh/g) | Volum. Capacity, 10 mA/g (Ah/cm$^3$) | Grav. Capacity, 50 mA/g (mAh/g) | Volum. Capacity, 50 mA/g (Ah/cm$^3$) |
|---|---|---|---|---|---|---|
| --- | 100 | 0 | 20 | 0.09 | --- | --- |
| 7a | 25 | 75 | 302 | 1.35 | 160 | 0.72 |
| 7b | 10 | 90 | 339 | 1.51 | 180 | 0.80 |
| 7c | 6 | 94 | 338 | 1.51 | 240 | 1.07 |
| C1 | 0 | 100 | 309 | 1.37 | 262 | 1.17 |

PRIMARY ALKALINE BATTERY CONTAINING BISMUTH METAL OXIDE

FIELD OF THE INVENTION

The invention relates to primary alkaline batteries.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to alkaline batteries, such as primary batteries, including bismuth.

In one aspect, the invention features a battery (e.g., a primary battery) including a cathode having a first active material including a metal oxide containing pentavalent bismuth (i.e., Bi(V)) and a second active material; an anode; an ion-permeable separator between the cathode and the anode; and an alkaline electrolyte.

In another aspect, the invention features a primary battery, including a cathode having an electrochemically active oxide containing pentavalent bismuth, the oxide being in the form of particles having a mean particle size of from about 0.005 to 50 microns; an anode; a separator between the cathode and the anode; and an alkaline electrolyte.

Embodiments may include one or more of the following features. The cathode further includes a second electrochemically active material. The second electrochemically active material includes manganese dioxide, nickel oxyhydroxide, silver oxide, silver nickelate, silver copper oxide, silver permanganate, barium permanganate, barium manganate, or barium ferrate. The second electrochemically active material has a mean particle size of from about 1 micron to 100 microns. The second electrochemically active material has a specific surface area of from about 3 to 50 $m^2/g$. The electrochemically active oxide includes an alkali metal, an alkaline earth metal, a transition metal, or a main group metal.

In another aspect, the invention features a primary battery, including a cathode having an electrochemically active oxide containing pentavalent bismuth, the oxide being in the form of particles having a true density of from about 5 to 9 g/cc; an anode; a separator between the cathode and the anode; and an alkaline electrolyte.

Embodiments may include one or more of the following features. The cathode further includes a second electrochemically active material. The second electrochemically active material includes manganese dioxide, nickel oxyhydroxide, silver oxide, silver nickelate, silver copper oxide, silver permanganate, barium permanganate, barium manganate, or barium ferrate. The second electrochemically active material has a mean particle size of from about 1 micron to 100 microns. The second electrochemically active material has a specific surface area of from about 3 to 50 $m^2/g$. The electrochemically active oxide includes an alkali metal, an alkaline earth metal, a transition metal, or a main group metal.

In another aspect, the invention features a primary battery, including a cathode having an electrochemically active oxide containing pentavalent bismuth, the oxide being in the form of particles having a specific surface area of from about 1 to 40 $m^2/g$; an anode; a separator between the cathode and the anode; and an alkaline electrolyte.

Embodiments may include one or more of the following features. The cathode further includes a second electrochemically active material. The second electrochemically active material includes manganese dioxide, nickel oxyhydroxide, silver oxide, silver nickelate, silver copper oxide, silver permanganate, barium permanganate, barium manganate, and barium ferrate. The second electrochemically active material has a mean particle size of from about 1 micron to 100 microns. The second electrochemically active material has a specific surface area of from about 3 to 50 $m^2/g$. The electrochemically active oxide includes an alkali metal, an alkaline earth metal, a transition metal, or a main group metal.

In another aspect, the invention features a primary battery, including a cathode having $NaBa_3BiO_6$; an anode; a separator between the cathode and the anode; and an alkaline electrolyte.

In another aspect, the invention features a primary battery, including a cathode having $Ag_2BiO_3$, $Ag_{7+x}BiO_6$, where $0 \leq x \leq 1.33$, $Sr_2FeBiO_6$, $Ba_2FeBiO_6$, or $Li_3Zn_2BiO_6$; an anode; a separator between the cathode and the anode; and an alkaline electrolyte.

In another aspect, the invention features a primary battery, including a cathode having $Ba_2LuBiO_6$, $Ba_2NdBiO_6$, $Ba_2YBiO_6$, $Ba_2LaBiO_6$, $Sr_2LuBiO_6$, $La_2Bi_2O_7$, or $La_10.5Sr_{0.5}Bi_2O_7$; an anode; a separator between the cathode and the anode; and an alkaline electrolyte.

In another aspect, the invention features a primary battery, including a cathode having $La_2PbBiO_7$; an anode; a separator between the cathode and the anode; and an alkaline electrolyte.

Embodiments of the above aspects may include one or more of the following features. The oxide includes an electrically conductive surface coating having carbon or a metal oxide. The electrically conductive surface coating includes graphite, carbon black, acetylene black, cobalt oxide, cobalt oxyhydroxide, silver oxide, silver nickel oxide, nickel oxyhydroxide, or indium oxide. The anode includes zinc. The separator is capable of preventing soluble bismuth species from diffusing from the cathode to the anode. The separator is capable of trapping soluble bismuth species. The separator includes a plurality of layers including at least one cellophane layer, one microporous layer, and one nonwoven layer. The separator includes a non-woven layer. The separator includes cellophane, a microporous membrane, a non-microporous polymer-based solid gel membrane, or an ion-selective layer. The battery further includes a first material capable of reducing the solubility of the oxide in the electrolyte. The first material includes barium hydroxide, barium oxide, barium fluoride, and barium sulfate, magnesium fluoride, calcium fluoride, strontium hydroxide, strontium fluoride, strontium oxide, zinc oxide, calcium hydroxide, calcium oxide, potassium fluoride, lanthanum hydroxide, cerium hydroxide, praseodymium hydroxide, neodymium hydroxide, europium hydroxide, aluminum hydroxide, aluminum oxide, or bismuth oxide. The electrolyte is saturated with the first material.

In another aspect, the invention features a primary battery, including a cathode having an electrochemically active oxide containing pentavalent bismuth, and a second electrochemically active material having a mean particle size of from about 1 micron to 100 microns; an anode; a separator between the cathode and the anode; and an alkaline electrolyte.

In another aspect, the invention features a primary battery, including a cathode having an electrochemically active oxide containing pentavalent bismuth, and a second electrochemically active material having a specific surface area of from about 3 to 50 $m^2/g$; an anode; a separator between the cathode and the anode; and an alkaline electrolyte.

Embodiments of the above aspects may include one or more of the following features. The second electrochemically active material includes manganese dioxide, nickel oxyhydroxide, silver oxide, silver nickelate, silver copper oxide, silver permanganate, barium permanganate, barium manganate, or barium ferrate. The oxide containing pentavalent bismuth includes an electrically conductive surface coating comprising carbon or a metal oxide. The electrically conductive surface coating includes graphite, carbon black, acetylene black, cobalt oxide, cobalt oxyhydroxide, silver oxide, silver nickel oxide, nickel oxyhydroxide, or indium oxide. The anode includes zinc. The separator is capable of preventing soluble bismuth species from diffusing from the cathode to the anode. The separator is capable of trapping soluble bismuth species. The separator includes a plurality of layers. The separator includes a non-woven layer, cellophane, a microporous membrane, a non-microporous polymer-based solid gel membrane, or an ion-selective layer. The battery further includes a first material capable of reducing the solubility of the oxide in the electrolyte. The first material includes barium hydroxide, barium oxide, barium fluoride, and barium sulfate, magnesium fluoride, calcium fluoride, strontium hydroxide, strontium fluoride, strontium oxide, zinc oxide, calcium hydroxide, calcium oxide, potassium fluoride, lanthanum hydroxide, cerium hydroxide, praseodymium hydroxide, neodymium hydroxide, europium hydroxide, aluminum hydroxide, aluminum oxide, or bismuth oxide. The electrolyte is saturated with the first material. The oxide containing pentavalent bismuth includes $MBiO_3$, $M_3BiO_4$, $M_7BiO_6$, $M_4Bi_2O_7$, and $M_5Bi_3O_{10}$, where M is Li, Na, K, Rb and/or Cs; $Li_5BiO_5$; and $Li_6$ $KBiO_6$; $Li_6RbBiO_3$; or $NaBa_3BiO_6$. The oxide containing pentavalent bismuth includes $MgBi_2O_6$, $SrBi_2O_6$, $Sr_2Bi_2O_7$, $LiSr_3BiO_6$, $NaSr_3BiO_6$, $Ba_{1-x}K_xBiO_3$, where $0.05 \leq x \leq 0.4$, $Sr_{1-x}K_xBiO_3$, where $0.05 \leq x \leq 0.4$, $Li_2Ba_5Bi_2O_{11}$, or $Ba_2Bi_2O_6$. The oxide containing pentavalent bismuth includes $ZnBi_2O_6$, $Cu_2Bi_2O_7$, $CdBi_2O_6$, $AgBiO_3$, $Ag_{25}Bi_3O_{18}$, $Ba_2YBiO_6$, $Ba_2LaBiO_6$, $Sr_2NdBiO_6$, $Ba_2InBiO_6$, $Ba(Bi,Pb)O_3$, $Sr_{18}Ru_{1.9}Bi_{4.1}O_{33}$, $Li_8PdBi_2O_{10}$, and $Sr_2ScBiO_6$. $Ag_2BiO_3$, $Ag_{7+x}BiO_6$, where $0 \leq x \leq 1.33$, $Sr_2FeBiO_6$, $Ba_2FeBiO_6$, and $Li_3Zn_2BiO_6$, $Ba_2LuBiO_6$, $Ba_2NdBiO_6$, $Ba_2YBiO_6$, $Ba_2LaBiO_6$, $Sr_2LuBiO_6$, $La_2Bi_2O_7$, $La_{1.5}Sr_{0.5}Bi_2O_7$; or $La_2PbBiO_7$.

Primary batteries are meant to be discharged, e.g., to exhaustion, only once, and then discarded. Primary batteries are not intended to be recharged. In comparison, secondary batteries can be recharged many times, e.g., more than fifty times, more than a hundred times, or more.

The pentavalent bismuth-containing metal oxide is capable of enhancing overall discharge performance of alkaline cells. For example, alkaline cells with cathodes including a pentavalent bismuth-containing metal oxide are capable of providing high energy (e.g., high theoretical volumetric energy densities) and substantial total discharge capacity at commercially useful average running voltages of between 1.4 and 1.7 V (e.g., at low discharge rates). An alkaline zinc primary cell having a cathode including, for example, a mixture of an electrolytic manganese dioxide (EMD) and a bismuth(V)-containing metal oxide can provide enhanced overall discharge performance relative to an alkaline cell with a cathode including EMD as the sole cathode active material present. Further, an alkaline cell with a cathode including, for example, a mixture of a beta-nickel oxyhydroxide and a bismuth(V)-containing metal oxide can provide enhanced overall discharge performance relative to an alkaline cell with a cathode including beta-nickel oxyhydroxide as the sole cathode active material present.

The alkaline cells described herein can have a volumetric capacity comparable to or greater than that of alkaline cells with a cathode including beta-nickel oxyhydroxide as the sole cathode active material when discharged at nominally medium (e.g., ~0.25-0.75 W) to high rates (e.g., $\geq 1$ W) and a volumetric capacity substantially greater when discharged at nominally low rates (e.g., $\leq 0.1$ W). Further, the alkaline cells described herein can have a volumetric capacity greater than that of alkaline cells with a cathode including EMD as the sole cathode active material when discharged at nominally medium (e.g., ~0.25-0.75 W) to high rates (e.g., $\geq 1$ W) and a volumetric capacity comparable to or greater when discharged at nominally low rates (e.g., <0.1 W).

Alkaline zinc primary cells with cathodes including beta-nickel oxyhydroxide can have open circuit voltages (OCV) greater than about 1.70 V (vs. $Zn/Zn^{+2}$). Average closed circuit voltages (CCV) can range from about 1.45 to 1.65 V.

Alkaline zinc primary cells with cathodes including Bi(V)-containing metal oxides typically can have open circuit voltages (OCV) greater than about 1.75 V (vs. $Zn/Zn^{+2}$). Average closed circuit voltages (CCV) can range from about 1.40 to 1.70 V.

Primary alkaline electrochemical cells having cathodes including Bi(V)-containing metal oxides are well suited for high-power applications, for example, in digital electronic devices such as cellular phones, digital still cameras, digital camcorders, digital audio players (e.g., MP-3), portable CD/DVD players, personal digital assistants (i.e., PDA), handheld video games, and handheld televisions as well as other high-power devices such as high-intensity portable light sources (e.g., flashlights, lamps) and electric motor-powered portable devices, for example, battery-powered toothbrushes, razors, electric shavers, and remote-controlled toys. The cells described herein can provide longer service life, for example, relative to a conventional zinc/manganese dioxide cell of the same size, particularly when used in medium to high power applications.

The cells can have relatively flat discharge voltage profiles suitable for powering certain digital electronic devices such as, digital cameras, and powered consumer products, for example, toothbrushes and razors. The pentavalent bismuth-containing metal oxides are thermally stable and can provide good cathode utilization (e.g., at high or low discharge rates) in certain cathode formulations. The cathode active material can be incorporated into cylindrical alkaline batteries of different sizes (e.g., AA, AAA, AAAA, C, D) as well as into batteries having other form-factors, such as button cells, coin cells, prismatic or flat batteries, and flexible pouch, envelope or bag cells in a cost effective manner. Many bismuth-containing compounds have low toxicity and benign environmental impact, so the manufacture and disposal of batteries containing pentavalent bismuth-containing metal oxides can raise relatively few health and environmental concerns.

Other aspects, features, and advantages will be apparent from the drawings, description, and claims.

DESCRIPTION OF THE DRAWINGS

FIG. 2 is a table summarizing the theoretical gravimetric and volumetric specific capacities, average closed circuit voltages, and volumetric energy densities of selected cathode active materials including pentavalent bismuth-containing metal oxides, β-nickel oxyhydroxide, electrolytic manganese dioxide, and silver (I) oxide.

FIG. 3 is a table summarizing the gravimetric and volumetric specific capacities and utilization of alkaline button cells with cathodes including uncoated and CoOOH-coated bismuth-containing metal oxides, EMD, and CoOOH-coated β-NiOOH cathode active materials discharged at 10 mA/g (e.g., "low rate") and 140 mA/g (e.g., "high rate") to a 0.8 V cutoff voltage.

DETAILED DESCRIPTION OF THE PREFERRED EMBODIMENTS

Figure 1:
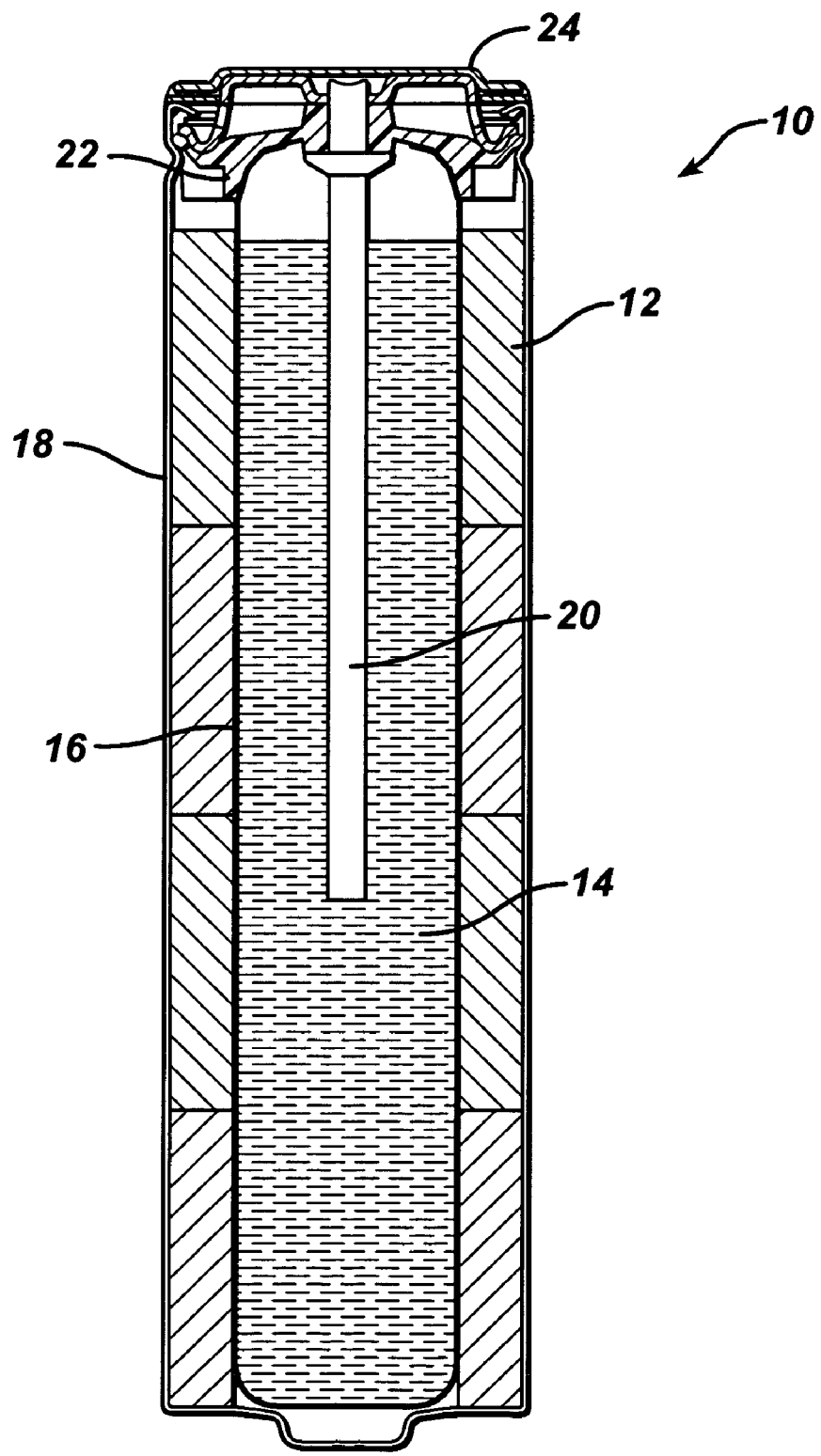
FIG. 1 is a side-sectional view of an alkaline primary cell.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal, 24. An electrolyte solution, e.g., an alkaline solution, is dispersed throughout battery 10.

Cathode 12 includes an electrochemically active material having one or more pentavalent bismuth-containing metal oxides and one or more second electrochemically active materials different from the pentavalent bismuth-containing metal oxide(s); one or more electrically conductive additives; and optionally, a binder. Examples of the second electrochemically active material include γ-manganese dioxide (γ-$MnO_2$), β-nickel oxyhydroxide (β-NiOOH), γ-nickel oxyhydroxide (γ-NiOOH), silver(I) oxide ($Ag_2O$), silver(II) oxide (AgO), silver copper oxide ($AgCuO_2$), silver nickelate ($AgNiO_2$), silver permanganate ($AgMnO_4$), barium permanganate ($Ba(MnO_4)_2$), barium manganate ($BaMnO_4$), and barium ferrate ($BaFeO_4$). Without wishing to be bound by theory, it is believed that the pentavalent bismuth-containing metal oxide can enhance the capacity and discharge performance of battery 10 because the pentavalent bismuth-containing metal oxide can have theoretical volumetric capacities that exceed that of the second electrochemically active material. For example, a pentavalent bismuth-containing metal oxide can have a theoretical volumetric capacity that exceeds that of EMD or β-nickel oxyhydroxide, e.g., by about 15% or more, by about 30% or more, by about 50% or more.

The pentavalent bismuth-containing metal oxide, sometimes called a "bismuthate", is generally a complex metal oxide containing pentavalent bismuth, i.e., Bi(V), optionally, trivalent bismuth, i.e., Bi(III) as a minor constituent (e.g., less than about 50 atomic percent) and one or more metals. For example, of the bismuth in a chemical formula unit of the complex metal oxide, at least about 50 atomic percent (e.g., at least about 60, 70, 80, 90, 95 or 99 atomic percent) is formally pentavalent bismuth. Pentavalent bismuth-containing metal oxides are capable of providing battery 10 with high volumetric energy density (e.g., the theoretical volumetric energy density can be higher than that for commercial alkaline zinc primary cells including $MnO_2$/Zn, β-NiOOH/Zn or $Ag_2O$/Zn) and having a commercially useful average running voltage range (e.g., a closed circuit voltage, CCV, of from about 1.4 V to 1.7 V) as summarized, for example, in FIG. 2. In embodiments, the pentavalent bismuth-containing metal oxides can have low solubility, for example, less than about 300 ppm, less than about 100 ppm or less than about 70 ppm at room temperature, in an alkaline electrolyte. The pentavalent bismuth-containing metal oxides can be thermally stable in air to a temperature greater than about 200° C. (e.g., greater than about 300° C.). It is believed that the good thermal stability of the pentavalent bismuth-containing metal oxides is indicative of the structural stability of the crystallographic lattice structure of the oxides and chemical stability of the oxides in the presence of electrolyte and other materials included in the battery. The pentavalent bismuth-containing metal oxides can have rutile, trirutile, ilmenite, fluorite, pyrochlore-type, weberite-related, perovskite-type or other related crystallographic lattice structures. As discussed below, the metal of the pentavalent bismuth-containing metal oxide can be an alkali metal, an alkaline earth metal, a transition metal, a lanthanide, and/or a main group metal or a mixture thereof.

In embodiments in which the pentavalent bismuth-containing metal oxide includes an alkali metal, the metal can be lithium, sodium, potassium, rubidium and/or cesium. Examples of pentavalent bismuth metal oxides including an alkali metal include $MBiO_3$, $M_3BiO_4$, $M_7BiO_6$, $M_4Bi_2O_7$, $M_5Bi_3O_{10}$ (where M is Li, Na, K, Rb, and/or Cs); $Li_5BiO_5$; and $Li_6KBiO_6$. Syntheses of alkali metal pentavalent bismuth-containing oxides are described, for example, in J. Trehoux et al., *Mater. Res. Bull.*, 17, 1235-43 (1982); E. Nomura et al., *J. Solid State Chem.*, 52, 91-3 (1984); C. Greaves et al., *Mater. Res. Bull.*, 24, 973-980 (1989); S. Kodialam et al., *Mater. Res. Bull.*, 27, 1379-1384 (1992); T. N. Nguyen et al., *Chem. Mater.*, 5(9), 1273-6 (1993); B. K. Kasenov et al., *Zhur. Fiz. Khim.*, 71(6), 1146-8 (1997); N. Kumada et al., *J. Solid State Chem.*, 126, 121-6 (1996); *Mater. Res. Bull.*, 32(8), 1003-1009 (1997); C. Muhle et al., *Inorg. Chem.*, 43, 874-881 (2004); and S. Vensky et al., *Z. Kristallogr.*, 220, 231-244 (2005). Any of the pentavalent bismuth-containing metal oxides can include more than one type of alkali metal, in any combination, for example, by ion substitution or ion exchange. Some examples include $Li_{1-x}Na_xBiO_3$ and $Na_{1-x}K_xBiO_3$, (where 0<x<1); $KLi_6BiO_6$; and $RbLi_6BiO_6$. The pentavalent bismuth-containing alkali metal oxides can be stoichiometric or non-stoichiometric, and can include trivalent bismuth as a minor constituent, e.g., less than about 50 atomic percent, 30 atomic percent, 10 atomic percent or 5 atomic percent. Syntheses of mixed alkali metal pentavalent bismuth-containing oxides are described, for example, in R. Huebenthal & R. Hoppe, *Acta Chem. Scand.*, 45(8), 805-811 (1991); and V. A. Carlson & A. M. Stacy, *J. Solid State Chem.*, 96, 332-343 (1992).

In embodiments in which the pentavalent bismuth-containing metal oxide includes an alkaline earth metal, the metal can be magnesium, calcium, strontium, and/or barium. Examples of alkaline metal bismuth oxides include $MgBi_2O_6$, $SrBi_2O_6$, $Sr_2Bi_2O_7$, $LiSr_3BiO_6$, $NaSr_3BiO_6$, $Ba_2Bi_2O_6$ or $Li_2Ba_5Bi_2O_{11}$. Syntheses of alkaline earth metal pentavalent bismuth-containing oxides are described, for example, in K. Kumada et al., *Mater. Res. Bull.*, 32, 1003-8 (1997); K. Kumada et al., *Solid State Ionics*, 122, 183-9 (1999); D. E. Cox & A. W. Sleight, *Solid State Commun.*, 19, 969-973 (1976); O. Knop et al., *Can. J. Chem.*, 58, 2221-4 (1980); A. Ramanan & J. Gopalakrishnan, *Rev. Chim. Miner.*, 19, 225-30 (1982); and in U.S. patent application Ser. Nos. 10/716,358 (filed Nov. 17, 2003) and 10/913,922 (filed Aug. 6, 2004) all hereby incorporated by reference. In some cases, for example, alkaline earth bismuth oxides such as perovskite-related $Ba_2Bi_2O_6$, the bismuth can have mixed valence, i.e., having both Bi(V) and Bi(III) species present. As with the alkali metal pentavalent bismuth-containing oxides, any of the alkaline earth metal pentavalent bismuth-containing oxides can include more than one type of alkaline earth metal or a combination of one or more alkali metals and one or more alkaline earth metals, in any combination. Some examples include $NaBa_3BiO_6$, $Ba_{1-x}K_xBiO_3$ and $Sr_{1-x}K_xBiO_3$ (where $0.05 \leq x \leq 0.4$), $LiSr_3BiO_6$, and $Li_2Ba_5Bi_2O_{11}$. The alkaline earth bismuth oxides can be stoichiometric or non-stoichiometric, and can include trivalent bismuth as a minor constituent e.g., less than about 50 atomic percent, 30 atomic percent, 10 atomic percent or 5 atomic percent. Non-stoichiometric metal bismuthates can include crystal lattice defects such as metal or oxygen vacancies. Syntheses of mixed alkali metal and alkaline earth metal pentavalent bismuth-containing oxides are described, for example, in A. W. Sleight et al., *Solid State Commun.*, 17, 27-8 (1975); *J. Solid State Chem.*, 78, 319 (1989); M. L. Norton, *Mater. Res. Bull.*, 24, 1391-7 (1989); S. F. Liu & W. T. Fu, *Mater. Res. Bull.*, 36, 1505-12 (2001); and V. A. Carlson & A. M. Stacy, *J. Solid State Chem.*, 96, 332-343 (1992).

The pentavalent bismuth-containing metal oxide can include one or more transition metals and/or one or more main group metals. The transition metal can be a first row transition metal (e.g., Sc, V, Mn, Fe, Co, Ni, Cu, or Zn), a second row transition metal (e.g., Y, Zr, Nb, Mo, Ru, Pd, Ag or Cd) or a third row transition metal (e.g., Ta, W). Examples of pentavalent bismuth-containing transition metal oxides include $ZnBi_2O_6$, $Cu_2Bi_2O_7$, $CdBi_2O_6$, $AgBiO_3$, $Ag_2BiO_3$, $Ag_{7+x}BiO_6$ ($0 \leq x<1.33$), $Ag_{25}Bi_3O_{18}$, $Ba_2YBiO_6$, $Sr_2ScBiO_6$, $Sr_2FeBiO_6$, $Ba_2FeBiO_6$, $Li_3Zn_2BiO_6$, $Sr_{18}Ru_{1.9}Bi_{4.1}O_{33}$, and $Li_8PdBi_2O_{10}$. The silver bismuthate phase $AgBiO_3$ can have cubic and hexagonal structures. Other silver bismuthate phases containing Bi(V) can be prepared by oxidizing a silver bismuthate containing only Bi(III), for example, $Ag_3BiO_3$ and $Ag_5BiO_4$, or a mixed valent silver bismuthate containing Bi(III) and Bi(V), for example, $Ag_2BiO_3$. A Bi(III)-containing silver bismuthate can be oxidized by an aqueous solution of an alkali peroxydisulfate, for example, $Na_2S_2O_8$ or $K_2S_2O_8$, an aqueous solution of an alkali hypochlorite, for example, NaOCl, or by a gas, for example, oxygen or ozone. A silver bismuthate phase can have a variable composition, for example, $Ag_{7+x}BiO_6$, where 0<x<1.33. Syntheses of transition metal pentavalent bismuth-containing oxides are described, for example, in N. Kumada et al., *Mater. Res. Bull.*, 32, 1003-8 (1997); *Adv. Ion-Exchange for Industry Research*, 239, 212-217 (1999); *Mater. Res. Bull.*, 35(2), 2397-2402 (2000); H. Mizoguchi et al., *Chem. Commun.*, (9), 1084-5 (2003); M. Bortz & M. Jansen, *Z. Anorg. Allgem, Chem* 612, 113-7 (1992); M. Jansen et al., *J. Solid State Chem.*, 147, 117-21(1999); *J. Solid State Chem.*, 162, 142-7 (2001); C. P. M. Oberndorfer and M. Jansen, *Z. Anorg. Allgem. Chem.*, 628, 1951-4 (2002); M. S. Martin-Gonzalez et al., *J. Solid State Chem.*, 173, 203-8 (1993); S.-H. Byeon et al., *Materials Letters*, 12, 163-7 (1991); C. Greaves & S. M. A. Katib, *Mat. Res. Bull.*, 25, 1175-82 (1990); and Y. Laligant & A. LeBail, *Euro. J. Solid State Inorg. Chem.*, 30, 689-698 (1993).

In other embodiments in which the pentavalent bismuth-containing metal oxide includes a transition metal, the transition metal includes a lanthanide including La, Ce, Pr, Nd, Sm, Eu, Gd, Tb, Dy, Ho, Er, Tm and/or Yb. Examples of pentavalent bismuth-containing lanthanide oxides include $Ba_2LuBiO_6$, $Ba_2NdBiO_6$, and $Ba_2YbBiO_6$ (having a double perovskite structure); $Ba_2LaBiO_6$ and $Sr_2LuBiO_6$ (having a monoclinically-distorted perovskite structure); and $La_2Bi_2O_7$ and $La_{1.5}Sr_{0.5}Bi_2O_7$ (having a pyrochlore-type structure). Syntheses of pentavalent bismuth-containing lanthanide oxides are described, for example, in H. Mizoguchi et al., *Chem. Commun.*, (9), 1084-5 (2003); A. Lenz & H. Mueller-Buschbaum, *J. Less Common Metals*, 161(1), 141-6 (1990); W. T. A. Harrison et al., *Chem. Mater.*, 7, 2161-7 (1995); R. B Macquart & B. J. Kennedy, *Chem. Mater.*, 17, 1905-9 (2005); and S. Uma & J. Gopalakrishnan, *J. Solid State Chem.*, 105, 595-8 (1993).

In still other embodiments, the pentavalent bismuth-containing metal oxide includes a main group metal. The metal can be, for example, In, Sn, Pb or Sb. Examples of pentavalent bismuth-containing main group metal oxides include $Ba_2InBiO_6$, $BaBi_{1-x}Pb_xO_3$, and $La_2PbBiO_7$. Syntheses of pentavalent bismuth-containing main group metal oxides are described, for example, in W. T. Fu et al., *Mater. Res. Bull.*, 35, 1205 (2000); S. Uma & J. Gopalakrishnan, J. Solid State Chem., 105, 595 (1993), and A. W. Sleight et al., *Solid State Commun.*, 17, 27 (1975). As for the pentavalent bismuth-containing metal oxides described above, the pentavalent bismuth-containing transition metal, lanthanide, or main group metal oxides can include more than one type of metal, in any combination. Pentavalent bismuth-containing metal oxides can be stoichiometric or non-stoichiometric, and also can contain mixed valent bismuth, i.e., both Bi(V) and Bi(III) species can be present.

In some embodiments, the pentavalent bismuth-containing metal oxide cathode active materials are capable of being reduced, e.g., to bismuth metal, during discharge without consuming water from the electrolyte solution. For example, referring to Equations 1-8 below, $MgBi_2O_6$ is capable of undergoing reduction in at least two steps. The first step (Equation 1) is a two-electron per bismuth reduction to $Bi_2O_3$, and the second step (Equation 5), a three-electron per bismuth reduction to Bi metal.

$$\text{Cathode Reaction: } MgBi_2O_6 + 2H_2O + 4e^- \rightarrow MgO + Bi_2O_3 + 4OH^- \quad (1)$$

$$\text{Anode Reactions: } 2Zn + 8OH^- \rightarrow 2Zn(OH)_4^{2-} + 4e^- \quad (2)$$

$$2Zn(OH)_4^{2-} \rightarrow 2ZnO + 4OH^- + 2H_2O \quad (3)$$

$$\text{Net Reaction: } MgBi_2O_6 + 2Zn \rightarrow MgO + 2ZnO + Bi_2O_3 \quad (4)$$

$$\text{Cathode Reaction: } Bi_2O_3 + 3H_2O + 6e^- \rightarrow 2Bi^0 + 6OH^- \quad (5)$$

$$\text{Anode Reactions: } 3Zn + 12OH^- \rightarrow 3Zn(OH)_4^{2-} + 6e^- \quad (6)$$

$$3Zn(OH)_4^{2-} \rightarrow 3ZnO + 6OH^- + 3H_2O \quad (7)$$

$$\text{Net Reaction: } Bi_2O_3 + 3Zn \rightarrow 3ZnO + 2Bi^0 \quad (8)$$

Net cell discharge reactions are shown in Equations 4 and 8. Since water is not consumed in either net cell discharge reaction, the total amount of water included in battery 10 (e.g., in the electrolyte) can be decreased without comprising performance. As a result, additional electrode active material can be added to cathode 12 and/or anode 14 in battery 10, thereby increasing total discharge capacity. If the Mg-containing discharge product of Equation 1 is magnesium hydroxide, $Mg(OH)_2$, instead of MgO, an additional mole of water can be added to the electrolyte to compensate for the water consumed by each mole of $MgBi_2O_6$ discharged.

The pentavalent bismuth-containing metal oxide can be semiconducting, such as $MgBi_2O_6$, $ZnBi_2O_6$, and $Ba_2InBiO_6$, for example. In some embodiments, the pentavalent bismuth-containing metal oxide can be a degenerate n-type semiconductor, such as $MgBi_2O_6$ and $ZnBi_2O_6$ as described in H. Mizoguchi et al., *Chem. Commun.*, (9), 1084-5 (2003).

In some embodiments, to enhance its bulk electrical conductivity, the pentavalent bismuth-containing metal oxide particles can include an electrically conductive portion, e.g., a surface coating that enhances inter-particle electrical conductivity. The conductive surface coating also can serve to enhance the total discharge capacity and/or the average running voltage of battery 10 (e.g., at low discharge rates), as well as enhance the effective cathode utilization (e.g., at high and low discharge rates). The conductive coating also can enhance stability of the cathode material in the electrolyte, e.g., by serving as a protective layer during storage at elevated temperatures. The conductive surface coating can include a carbonaceous material, such as graphite (natural or synthetic), carbon black, and/or graphitized carbon black. Additionally or alternatively, the conductive surface coating can include a metal, such as gold or silver, and/or a conductive or semiconductive metal oxide, such as cobalt oxide (e.g., $CO_3O_4$), cobalt oxyhydroxide, silver oxide, silver nickelate, silver bismuthate, nickel oxyhydroxide, indium oxide or indium tin oxide. The conductive layer can include a nanoparticulate conductive metal oxide. The conductive surface coating can be applied or deposited, for example, using solution techniques including precipitation and subsequent chemical oxidation, electrodeposition, electroless deposition or by vapor phase deposition (e.g., sputtering, physical vapor deposition, or chemical vapor deposition). A conductive coating thickness can be provided by applying the conductive material at a level of about 2-percent by weight (e.g., greater than or equal about 2, 3, 4, 5, 6, 7, 8, 9, 10, 11, 12, 13, or 14 percent by weight, and/or less than or equal to about 15, 14, 13, 12, 11, 10, 9, 8, 7, 6, 5, 4, or 3 percent by weight) relative to the total weight of the pentavalent bismuth-containing metal oxide. The conductive layer can cover at least about 60% (e.g., at least about 75%, at least about 90%) of the surface of the Bi(V)-containing complex metal oxide.

Bismuth(V)-containing metal oxides can include discrete particles, aggregates or agglomerates of particles that can have cubic, cuboctahedral, plate-like, rod-like, and rectangular or trigonal prismatic morphologies. Particles can have a mean average particle size ranging from about 0.005 to 50 microns (e.g., about 0.05 to 20 microns, about 0.1 to 15 microns). Typically, bismuth(V)-containing metal oxides can have true densities (i.e., experimentally determined with a helium pycnometer) ranging from about 5 to 9 g/cm$^3$ (e.g., about 6 to 8 g/cm$^3$) and specific surface areas (i.e., experimentally determined from $N_2$ adsorption isotherms by the B.E.T. method) ranging from about 1 to 40 m$^2$/g (e.g., about 2 to 20 m$^2$/g, about 3 to 10 m$^2$/g).

Cathode 12 can include one or more (e.g., two, three or more) of the above pentavalent bismuth-containing metal oxides, in any combination. For example, cathode 12 can include a mixture of $AgBiO_3$, $MgBi_2O_6$, $KBiO_3$, and/or $ZnBi_2O_6$.

As indicated above, in addition to one or more pentavalent bismuth-containing metal oxide(s), cathode 12 further includes one or more second electrochemically active materials. Examples of second electrochemically active materials include manganese dioxide (MnO2), nickel oxyhydroxide (NiOOH), silver(I) oxide ($Ag_2O$), silver(II) oxide (AgO), silver nickelate ($AgNiO_2$), silver copper oxide ($AgCuO_2$), silver permanganate ($AgMnO_4$), barium permanganate ($Ba(MnO_4)_2$), barium manganate ($BaMnO_4$), and barium ferrate ($BaFeO_4$). In some embodiments, the second electrochemically active material(s) can have an open circuit (OCV) and/or average closed circuit voltages (CCV) comparable to those of the pentavalent bismuth-containing metal oxide(s) (e.g., $MgBi_2O_6$ or $AgBiO_3$) in order to avoid parasitic self-discharge reactions. In other embodiments, the second electrochemically active material(s) can have a theoretical volumetric capacity (i.e., Ah/cm$^3$) equal to or greater than about 1.2 Ah/cm$^3$.

As one example, the electrochemically active materials of cathode 12, can include a mixture of one or more pentavalent bismuth-containing metal oxide(s) and a manganese dioxide (e.g., electrolytically-synthesized γ-MnO$_2$ (EMD), or chemically-synthesized γ-MnO$_2$ (CMD) or a blend of EMD and CMD). Manganese dioxide can be prepared by a variety of synthetic methods. Electrolytic manganese dioxide can be prepared electrochemically by electrodeposition from an acidic aqueous solution of manganese(II) sulfate. Chemically-synthesized manganese dioxide can be prepared by oxidation of an aqueous solution of a manganese(II) salt with a strong chemical oxidant such as an alkali hypochlorite or alkali peroxydisulfate or by reduction of a manganese(VII) salt such as an alkali permanganate, for example, KMnO$_4$, by a reducing agent such as an organic acid or an aldehyde or a solution of a manganese(II) salt. The manganese dioxide can be EMD having a high power coefficient, as described in U.S. Pat. No. 6,509,117, hereby incorporated by reference in its entirety. EMD can have a mean average particle size of from 1 to 100 microns, e.g., from about 25 to 45 microns, and a specific surface area of from 20 to 40 m$^2$/g. The pentavalent bismuth-containing metal oxides can enhance the average running voltage and/or the volumetric energy density of an EMD-containing cell. In addition, because pentavalent bismuth-containing metal oxides can have substantially higher true densities (e.g., from about 6 to 8 g/cm$^3$) than EMD (from about 4.4 to 4.6 g/cm$^3$) and in some embodiments do not consume water during discharge unlike EMD, the volumetric capacities of alkaline cells containing pentavalent bismuth-containing metal oxides can be greater than that of conventional alkaline cells with cathodes including EMD as the only active material. In some cases, for example, the specific discharge capacity above about 0.8 V of alkaline cells containing one or more pentavalent bismuth-containing metal oxides as additives can be increased substantially compared to cells containing EMD as the sole active cathode material. Moreover, cathode utilization (e.g., below about 0.8 V) for alkaline cells containing the pentavalent bismuth-containing metal oxides as additives can be increased because of the formation of metallic Bi via reduction of Bi$_2$O$_3$ formed by initial discharge of Bi(V) to Bi(III).

As another example, as the electrochemically active materials of cathode 12, a pentavalent bismuth-containing metal oxide can be mixed with a second electrochemically active material, e.g., nickel oxyhydroxide. Nickel oxyhydroxide is disclosed in U.S. Pat. No. 6,991,875 and commonly-assigned U.S. application Ser. No. 10/831,899 filed Apr. 26, 2004. For example, nickel oxyhydroxide can be prepared via chemical oxidation of a nickel hydroxide. The nickel hydroxide can include beta-phase nickel hydroxide, alpha-phase nickel hydroxide, and/or a mixed-phase nickel hydroxide including various combinations of alpha-phase and beta-phase nickel hydroxides, and optionally, can include amorphous phases. The nickel hydroxide can include approximately spherical, spheroidal or ellipsoidal particles having a mean average size ranging from about 5 to 50 microns. Solution-based chemical oxidants include, for example, a basic solution of sodium hypochlorite (NaOCl) or potassium hypochlorite (KOCl) and an aqueous solution of sodium peroxydisulfate (Na$_2$S$_2$O$_8$), potassium peroxydisulfate (K$_2$S$_2$O$_8$) or ammonium peroxydisulfate ((NH$_4$)$_2$S$_2$O$_8$). Nickel(II) hydroxide also can be mixed with an alkali hydroxide salt in an air-free atmosphere and then oxidized in the solid state with humidified ozone gas as disclosed in commonly-assigned U.S. application Ser. No. 10/086,807 filed Mar. 4, 2002. Alternatively, a dispersion of nickel hydroxide can be oxidized electrolytically to nickel oxyhydroxide in an aqueous solution of an alkali metal halide salt, for example sodium or potassium chloride, as disclosed in U.S. Application Publication No. 2003/0186125 A1. The nickel oxyhydroxide can include beta-phase nickel oxyhydroxide, gamma-phase nickel(III, IV) oxyhydroxide, a solid solution of beta-phase and gamma-phase nickel oxyhydroxides, or mixtures thereof, and optionally, can include amorphous phases. The nickel oxyhydroxide can be a powder including particles having a nominally spherical, spheroidal or ellipsoidal shape. The mean average particle size of the nickel oxyhydroxide particles can range from about 2 to 50 microns (e.g., about 5 to 30 microns, about 10 to 25 microns, about 15 to 20 microns). The specific surface area of the nickel oxyhydroxide can range from about 3 to 50 m$^2$/g (e.g., about 5 to 20 m$^2$/g). Nickel oxyhydroxides can be obtained commercially from, for example, Tanaka Chemical Co. (Fukui, Japan), Kansai Catalyst Co., Ltd. (Osaka, Japan), H.C. Starck GmbH & Co. (Goslar, Germany), and Umicore Canada Inc. (Leduc, Alberta, Canada).

The second electrochemically active material (e.g., nickel oxyhydroxide) can include an optional dopant, for example, a bulk dopant in solid solution. The dopant can be selected from sodium, magnesium, calcium, strontium, barium, scandium, yttrium, lanthanum, rare earth metals, titanium, zirconium, hafnium, chromium, manganese, nickel, cobalt, copper, silver, zinc, cadmium, aluminum, gallium, indium, bismuth and combinations thereof. The dopant can be present at a weight percentage of less than about 10% (e.g., less than about 5% or less than about 2%) relative to the second electrochemically active material.

In some embodiments, the second electrochemically active material (e.g., nickel oxyhydroxide) can further include a conductive surface coating, as described hereinabove. For example, the nickel oxyhydroxide can include a conductive cobalt(III) oxyhydroxide coating on the surface of the nickel oxyhydroxide particles that can serve to enhance inter-particle electrical conductivity in cathode 12. The conductive surface coating can be present at a weight percentage of from about 1 to about 10% (e.g., from about 2 to about 8%, or from about 3 to about 5%) relative to the total weight of the second electrochemically active material(s) and the surface coating. The conductive surface coating can cover at least about 60% (e.g., at least about 70%, 80%, 90%) of the surface of the second electrochemically active material(s). The conductive surface coating can further include an optional dopant (e.g., sodium, magnesium, calcium, barium, strontium) as described above.

In other embodiments, cathode 12 includes between about 50 percent and about 95 percent by weight, for example, between about 60 percent and about 90 percent by weight, or between about 70 percent and about 85 percent by weight, of electrochemically active cathode materials by weight. Cathode 12 can include greater than or equal to about 50, about 55, about 60, about 65, about 70, about 75, about 80, about 85, or about 90 percent by weight, and/or less than or equal to about 95, about 90, about 85, about 80, about 75, about 70, about 65, about 60, or about 55 percent by weight of the cathode active materials. Of the total amount of electrochemically active materials in cathode 12, the pentavalent bismuth-containing metal oxide(s) can make up between greater than about one percent to less than about 100 percent by weight of the active materials. For example, cathode 12 can include greater than or equal to about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of pentavalent bismuth-containing metal oxide(s); and/or less than or equal to about 99%, about 95%, about 90%, about 85%, about 80%, about 75%, about 70%, about 65%, about 60%, about 55%, about 50%, about 45%, about 40%, about 35%, about 30%, about 25%, about 20%, about 15%, about 10%, or about 5% by weight of one or more pentavalent bismuth-containing metal oxides.

Figures 4, 5:
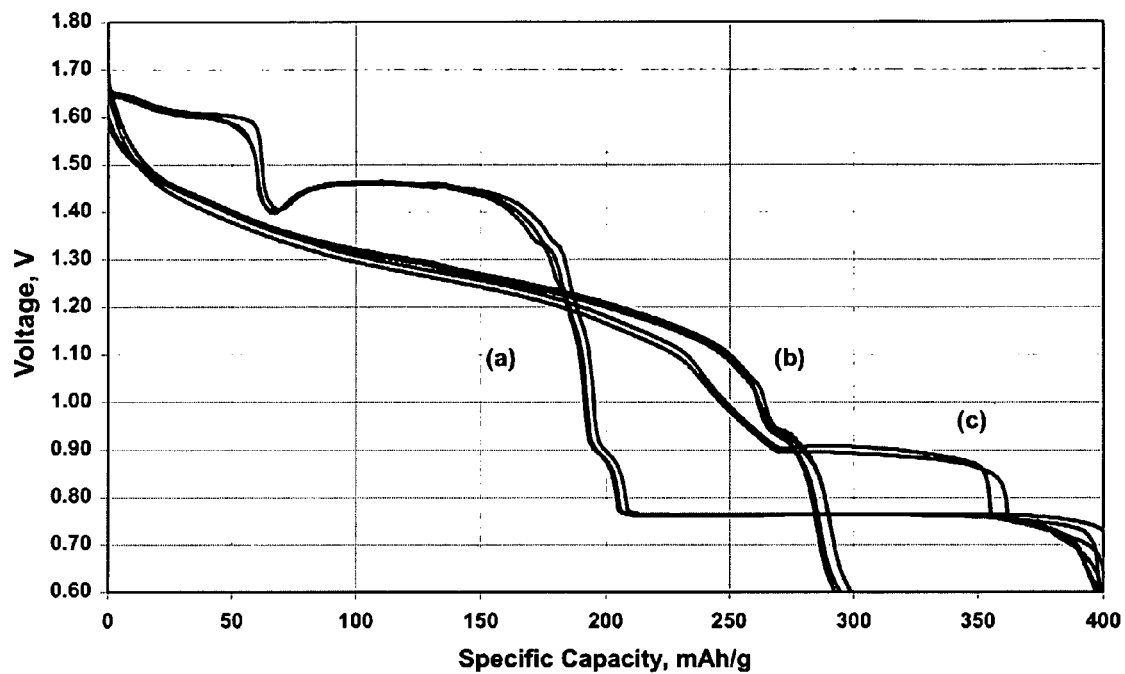
FIG. 4 is a composite of discharge curves for alkaline button cells with cathodes including: (a) uncoated cubic-$AgBiO_3$; (b) EMD; and (c) a mixture of 10% by weight cubic-$AgBiO_3$ and 90% by weight EMD discharged at 10 mA/g to a 0.8 V cutoff voltage.
FIG. 5 is a table summarizing the gravimetric and volumetric specific capacities of alkaline button cells with cathodes including mixtures of uncoated cubic-$AgBiO_3$ and EMD discharged at 10 mA/g and 140 mA/g to a 0.8 V cutoff voltage.

The enhanced performance of an alkaline primary cell including a mixture of electrochemically active cathode materials, for example, including at least one pentavalent bismuth-containing metal oxide and one or more second electrochemically active materials is demonstrated as follows. FIG. 4 shows the discharge curves for alkaline button cells with cathodes including: (a) 75 wt % cubic-silver bismuthate (cubic-$AgBiO_3$), 20 wt % oxidation-resistant graphite (e.g., Timrex® SFG-15), and 5 wt % 9N KOH electrolyte solution; (b) 75 wt % EMD (e.g., Kerr McGee, Trona D), 20 wt % oxidation-resistant graphite, and 5 wt % 9N KOH electrolyte solution; and (c) 67.5 wt % EMD, 7.5 wt % cubic-$AgBiO_3$, 20 wt % oxidation resistant graphite, and 5 wt % 9N KOH electrolyte solution, that were discharged fresh at a low rate (e.g., C/20; 10 mA/g active) to a 0.8 V cutoff voltage. The average closed circuit voltage for cells containing cubic-$AgBiO_3$ as the sole cathode active material depicted by curve (a) in FIG. 4 was about 1.68 V. The low rate gravimetric capacity of the cells was about 200 mAh/g, which corresponds to about 91% of the theoretical 3-electron specific capacity of 220 mAh/g for $AgBiO_3$ as given in FIG. 2. The average closed circuit voltage for cells containing EMD as the sole cathode active material depicted by curve (b) in FIG. 4 was about 1.25 V. The low rate gravimetric capacity of the cells was about 287 mAh/g, which corresponds to about 93% of the theoretical 1-electron specific capacity of 307 mAh/g for EMD. In comparison, the alkaline button cells of discharge curve (c) of FIG. 4 with cathodes containing a mixture of cubic-$AgBiO_3$ and EMD in a 1:9 weight ratio (i.e., 7.5% by weight cubic-$AgBiO_3$ and 67.5% by weight EMD) had a low rate gravimetric capacity of about 351 mAh/g which is about 22% greater than that for cells with cathodes containing EMD as the sole active material and more than 75% greater than that for cells with cathodes containing cubic-$AgBiO_3$ as the sole active material.

Furthermore, because the true density (i.e., measured by helium pycnometer) of cubic-$AgBiO_3$ is substantially greater than that of EMD, the theoretical volumetric capacity (i.e., Ah/cm$^3$) of cubic-$AgBiO_3$ (1.81 Ah/cm$^3$) as the sole cathode active material can be as much as 30% greater than that of manganese dioxide as the sole cathode active material as given in FIG. 2. The volumetric capacity (i.e., calculated from the corresponding experimental densities and gravimetric capacities for the respective cathode active materials) for the cells of curve (c) in FIG. 4 with cathodes including a mixture of cubic-$AgBiO_3$ and EMD in a 1:9 weight ratio is nearly 33% greater than that for the cells of curve (b) in FIG. 4 with cathodes including EMD as the sole active material as given in FIG. 5. Similarly, the volumetric capacity (i.e., calculated using the corresponding experimental densities and experimental gravimetric capacities for the respective cathode active materials) for cells with cathodes including a mixture of cubic-$AgBiO_3$ and EMD in a 1:3 weight ratio (i.e., 18.75% by weight cubic-$AgBiO_3$ and 56.25% by weight EMD) given in FIG. 5 is about 37% greater than that for the cells of curve (b) in FIG. 4 with cathodes including EMD as the sole active material. Cells with cathodes including a mixture of cubic-$AgBiO_3$ to EMD in a weight ratio as low as 1:19 still provided an improvement of about 20% in the low rate volumetric capacity. However, at the high discharge rate (e.g., 140 mA/g active), button cells with cathodes including a mixture of cubic-$AgBiO_3$ and EMD in a 1:3 weight ratio provided a volumetric capacity to a 0.8 V cutoff voltage that was only 5% greater than that for cells with cathodes including EMD as the sole active material. Alternatively, CoOOH-coated cubic-$AgBiO_3$, hexagonal-$AgBiO_3$ or CoOOH-coated $MgBi_2O_6$ can be substituted for the cubic-$AgBiO_3$ in the mixture with EMD.

Figure 6A:
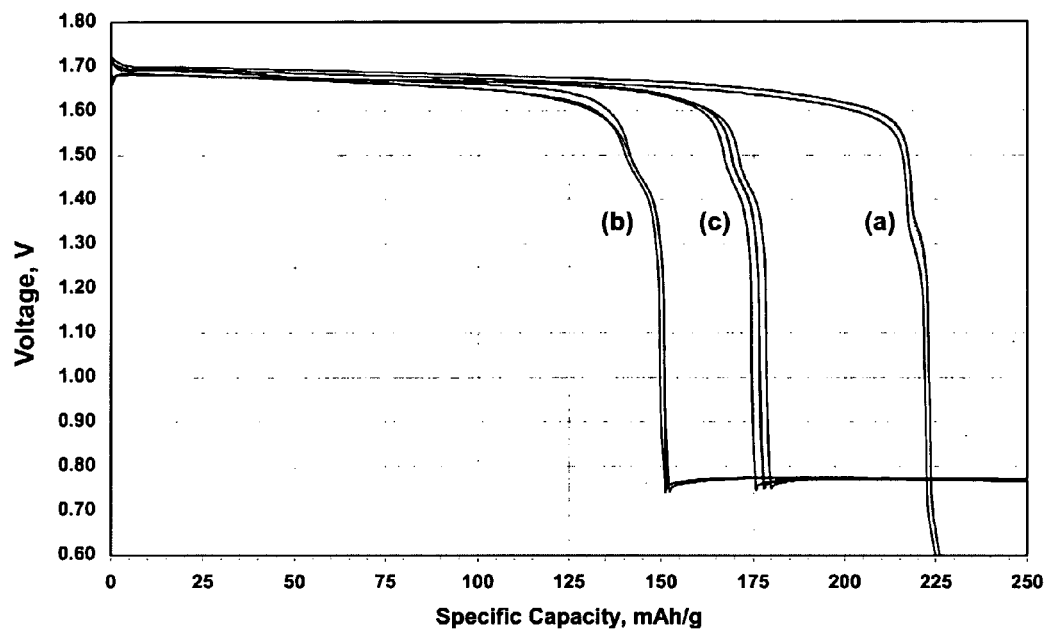
FIG. 6A is a composite of discharge curves indicating the gravimetric specific capacities (i.e., mAh/g) for alkaline button cells with cathodes including: (a) CoOOH-coated β-NiOOH; (b) CoOOH-coated $MgBi_2O_6$; and (c) a mixture of 67% by weight CoOOH-coated $MgBi_2O_6$ and 33% by weight CoOOH-coated β-NiOOH discharged at 10 mA/g to a 0.8 V cutoff voltage.
Figure 6B:
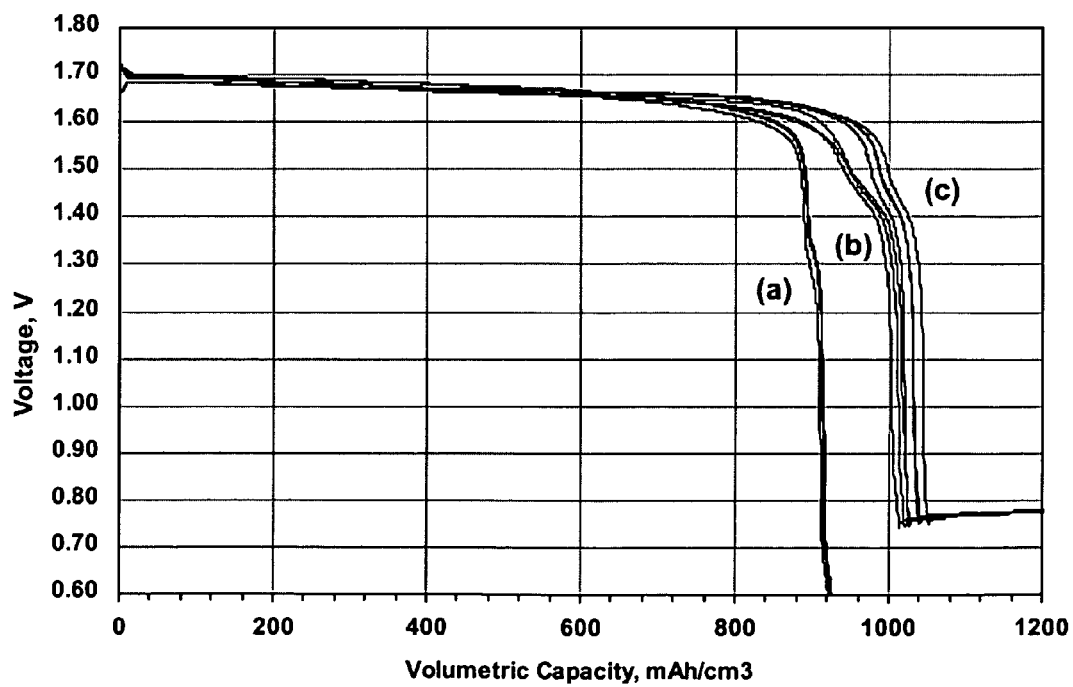
FIG. 6B is a composite of discharge curves indicating the volumetric specific capacities (i.e., mAh/cm$^3$) for alkaline button cells with cathodes including: (a) CoOOH-coated β-NiOOH; (b) CoOOH-coated $MgBi_2O_6$; and (c) a mixture of 67% by weight CoOOH-coated $MgBi_2O_6$ and 33% by weight CoOOH-coated β-NiOOH discharged at 10 mA/g to a 0.8 V cutoff voltage.
Figures 7, 8:
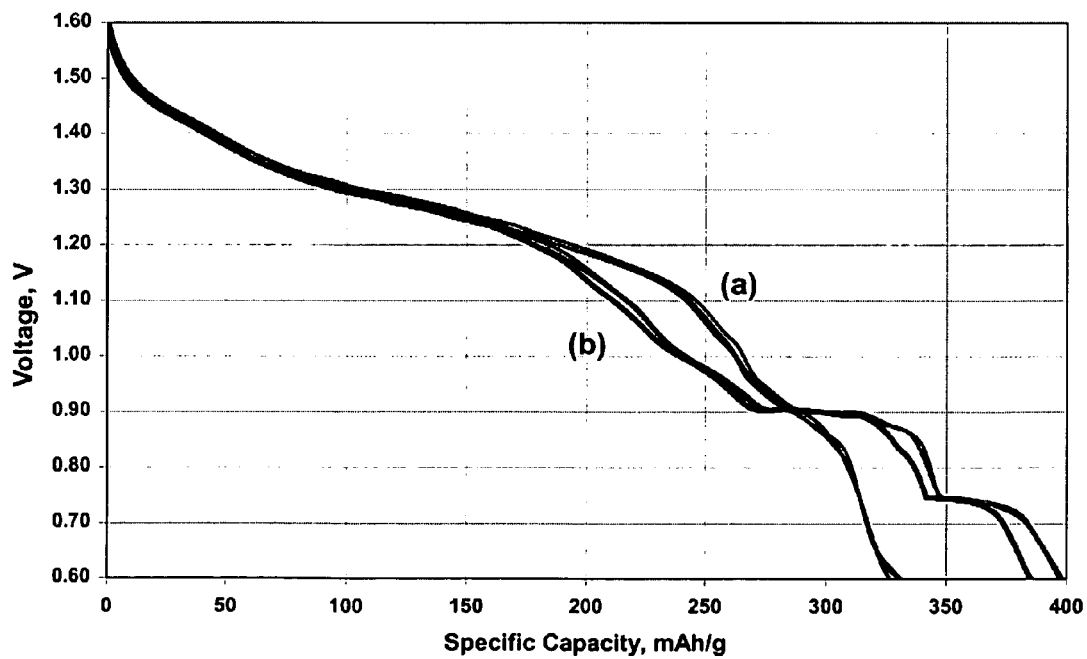
FIG. 7 is a table summarizing the gravimetric and volumetric specific capacities of alkaline button cells with cathodes including mixtures of CoOOH-coated $MgBi_2O_6$ and CoOOH-coated β-NiOOH discharged at 10 mA/g and 140 mA/g to a 0.8 V cutoff voltage.
FIG. 8 is a composite of discharge curves for alkaline button cells with cathodes including: (a) EMD; and (b) a mixture of 6% by weight $NaBiO_3$ and 94% by weight EMD discharged at 10 mA/g to a 0.8 V cutoff voltage.

As an additional example, the performance of alkaline button cells with cathodes including mixtures of CoOOH-coated magnesium bismuthate ($MgBi_2O_6$) and CoOOH-coated β-nickel oxyhydroxide (β-NiOOH) in various weight ratios discharged at both the low and the high rates is summarized in FIG. 7. Button cells with cathodes including either CoOOH-coated $MgBi_2O_6$ or CoOOH-coated β-NiOOH as the sole active cathode material discharged at the low rate (e.g., 10 mA/g active) had discharge curves with the same average CCV of about 1.67 V. Button cells with cathodes including a mixture of CoOOH-coated $MgBi_2O_6$ and CoOOH-coated β-NiOOH in a 2:1 weight ratio had a gravimetric specific capacity that was about 20% less than that of cells with cathodes including EMD as the sole active material when discharged at the low drain rate as shown in FIG. 6A. However, the cells with cathodes including a mixture of CoOOH-coated $MgBi_2O_6$ and CoOOH-coated β-NiOOH in a 2:1 weight ratio had a volumetric capacity that was about 17% greater than that of cells with cathodes including EMD as the sole active material as shown in FIG. 6B. At the high discharge rate (e.g., 140 mA/g active), the difference in volumetric capacity of button cells with cathodes including a mixture of CoOOH-coated $MgBi_2O_6$ and CoOOH-coated β-NiOOH in a 2:1 weight ratio was less significant than at the low rate, for example, only about 5-7% greater than that for cells with cathodes including EMD as the sole active material.

Without wishing to be bound by theory, it is believed that cathodes including CoOOH-coated $MgBi_2O_6$ cannot support current densities as large as those for cathodes including β-NiOOH. Thus, at the high discharge rate, a cathode including CoOOH-coated $MgBi_2O_6$ can be subject to a higher level of polarization than a cathode including CoOOH-coated β-NiOOH as the sole active material, thereby decreasing the volumetric capacity. By adding CoOOH-coated β-NiOOH to cathodes including CoOOH-coated $MgBi_2O_6$, higher current densities can be supported and volumetric capacity improved at high discharge rates. Alternatively, CoOOH-coated $ZnBi_2O_6$ can be substituted for the CoOOH-coated $MgBi_2O_6$ in the mixture with CoOOH-coated β-NiOOH.

Figures 9, 10:
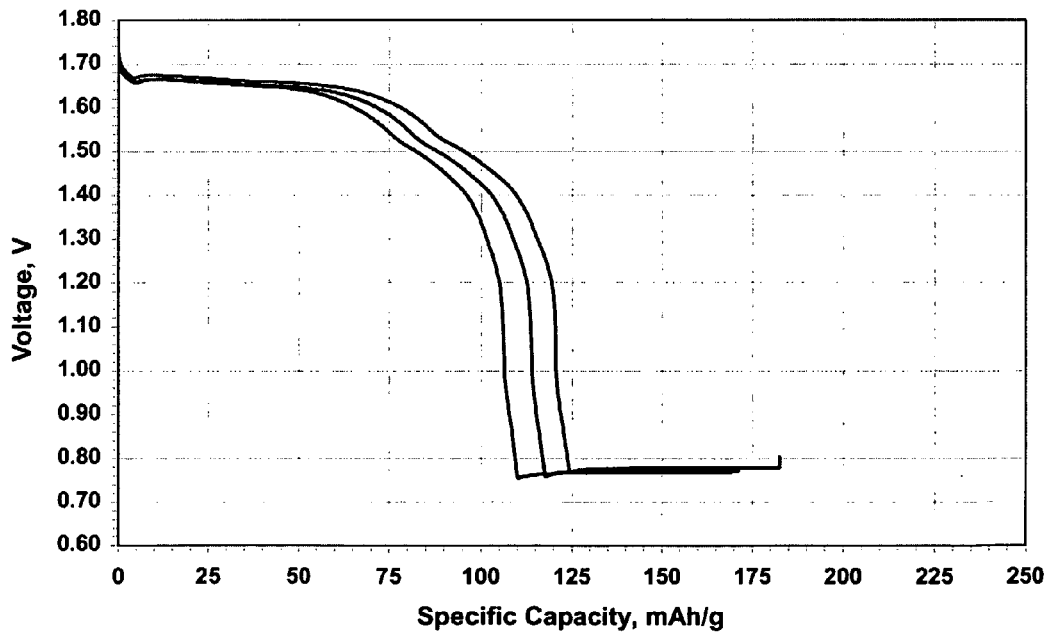
FIG. 9 is a table summarizing the gravimetric and volumetric specific capacities of alkaline button cells with cathodes including mixtures of $NaBiO_3$ and EMD discharged at 10 mA/g and 50 mA/g to a 0.8 V cutoff voltage.
FIG. 10 shows discharge curves for an alkaline button cell with a cathode including CoOOH-coated $LiBiO_3$ discharged at 10 mA/g to a 0.8 V cutoff voltage.

The performance of alkaline button cells with cathodes containing mixtures of hydrated sodium bismuthate ($NaBiO_3 \cdot xH_2O$, $1.1 \leq x \leq 1.4$) and EMD in various weight ratios discharged at low (e.g., 10 mA/g) and medium (e.g., 50 mA/g) rates is summarized in FIG. 9. Referring to FIG. 8, discharge curves are shown for alkaline button cells with cathodes containing: (a) 75 wt % EMD, 20 wt % oxidation-resistant graphite (e.g., Timrex® SFG-15), and 5 wt % 9N KOH electrolyte solution; and (b) a mixture of 70.5 wt % EMD, 4.5 wt % $NaBiO_3$ (i.e., $NaBiO_3$ to EMD weight ratio of about 1:16), 20 wt % oxidation resistant graphite, and 5 wt % 9N KOH electrolyte solution discharged fresh at a low rate (e.g., 10 mA/g active) to a 0.8 V cutoff voltage. The average closed circuit voltage (CCV) for cells containing EMD as the sole cathode active material of curve (a) in FIG. 8 was about 1.25 V. Low rate gravimetric capacity of the cells was about 287 mAh/g, which corresponds to about 93% of the theoretical one-electron specific capacity of 307 mAh/g for EMD.

Cells of curve (b) of FIG. 8 with cathodes including a 1:16 weight ratio (i.e., 4.5% by weight. $NaBiO_3$ and 70.5% by weight EMD) mixture of $NaBiO_3$ and EMD had a low rate gravimetric capacity of about 341 mAh/g, which is about 10% greater than that for cells including only EMD.

Furthermore, the calculated volumetric capacity (i.e., calculated using the corresponding experimental densities and experimental gravimetric capacities for the respective cathode active materials) for cells with cathodes including a mixture of $NaBiO_3$ and EMD in a 1:16 weight ratio given in FIG. 9 is about 10% greater than that for cells with cathodes including EMD as the sole active material. In the case of cells with cathodes including either a greater weight ratio of $NaBiO_3$ to EMD (e.g., about 1:9 or about 1:3), the increase in volumetric capacity relative to that of cells including EMD as the sole cathode active material was somewhat less as given in FIG. 9. At nominally medium (e.g., 50 mA/g) or high drain rates (e.g., 140 mA/g), differences in volumetric capacities typically were less significant than at low drain rate (e.g., 10 mA/g). The hydrated $NaBiO_3$ can be a nanoparticulate hydrated $NaBiO_3$. Alternatively, CoOOH-coated $LiBiO_3$ or CoOOH-coated $KBiO_3$ can be substituted for hydrated $NaBiO_3$ in mixtures with EMD.

Referring again to FIG. 1, as indicated above, cathode 12 can include one or more electrically conductive additives capable of enhancing the bulk electrical conductivity of cathode 12. Examples of conductive additives include particles of natural or non-synthetic graphite, oxidation-resistant natural or non-synthetic graphite, synthetic graphite, oxidation-resistant synthetic graphite, highly graphitized carbon blacks, gold powder, cobalt oxides, e.g., cobalt oxyhydroxide, and/or carbon nanofibers. In certain embodiments, the graphite particles are nonsynthetic, nonexpanded graphite particles available from, for example, Brazilian Nacional de Grafite, Itapecirica, MG Brazil (e.g., MP-0702X). In embodiments, the graphite particles are synthetic, non-expanded graphite particles, available from, for example, Timcal, Ltd., Bodio, Switzerland (e.g., Timrex® KS4, KS6, KS10, KS15, KS44). In other embodiments, the conductive additive is strongly resistant to oxidation by a Bi(V)-containing metal oxide cathode material and can have an oxidation potential that is capable of directly oxidizing the conductive additive during storage of the cell, particularly during storage at elevated temperatures. Oxidation of graphite can decrease bulk cathode conductivity as well as form carbon dioxide that can react with alkaline electrolyte to form potassium carbonate in solution. An increase in carbonate ion concentration can decrease the ionic conductivity of the electrolyte and increase polarization of the zinc anode thereby degrading cell performance. The oxidation-resistant graphite particles can be synthetic or natural, non-expanded or non-exfoliated graphite particles.

Oxidation resistance of graphite can be determined by many contributing factors. For example, it is believed that the rate of graphite oxidation is at least partially related to the specific surface area of the graphite particles, i.e., the smaller the specific surface area, the more oxidation resistant the graphite. Similarly, oxidation resistance of graphite can be at least partially related to the mean average particle size as well as the particle size distribution. Because larger size particles typically have lower surface areas, they can be more oxidation resistant. In addition, graphite with a particle size distribution having a large fraction of small particles can be less oxidation-resistant than one having a smaller fraction of small particles. However, in embodiments, the average particle size is sufficiently small to form an efficient conductive network inside the cathode, in which the graphite particles can be in intimate contact with both Bi(V)-containing metal oxide particles and other graphite particles. An oxidation-resistant graphite can have an average particle size from about 2 to 50 microns (e.g., about 3 to 30 microns, about 5 to 20 microns). Also, oxidation resistance is believed to be related at least partially to average crystallite size of the graphite particles. A graphite having a large average crystallite size (e.g., higher crystallinity) can exhibit good oxidation resistance. In embodiments, the average crystallite size (which can be determined by X-ray diffraction) is greater than about 2000 angstroms along the a-axis direction, $L_a$, and greater than about 1500 angstroms along the c axis direction, $L_c$. Another indicator of the degree of graphite crystallinity that can be determined by X-ray diffraction is the lattice spacing of the 002 peak ($d_{002}$) which corresponds to the distance between adjacent graphene planes in the graphite crystal structure. As the value of $d_{002}$ approaches that of an ideal graphite crystal, namely, 0.3354 nm, the degree of crystallinity increases. Further, it is believed that oxidation resistance also can depend at least partially on the relative number of crystal lattice defects, surface defects or dislocations present in the graphite particles. For example, lattice defects can include rhombohedral stacking defects. Surface defects can include superficially disordered carbon atoms, prismatic surfaces, polar edges, and oxygen-containing functional groups associated with polar edges. Laser micro-Raman spectroscopy can be used to detect the presence of surface defects in graphites. Typically, the ratio of the normalized intensities or alternatively, the integrated peak areas for two peaks appearing in the first order Raman spectrum centered at about 1570-1580 $cm^{-1}$ (a sharp, intense "G" band) and at about 1330 to 1360 $cm^{-1}$ (a broader, weaker "D" band) commonly known as the graphite "defect ratio" can be correlated with the relative number of defects. A method for assessing the relative degree of oxidation resistance of a graphite is disclosed in commonly-assigned U.S. patent application Ser. No. 10/831,899, filed Apr. 26, 2004. Characteristically, an oxidation-resistant graphite can have relatively low levels of defects as reflected by relatively low values for the graphite defect ratio. Typically, small graphite particles produced by mechanical grinding of larger particles have higher levels of defects than the initial larger particles. In some embodiments, small graphite particles can have lower defect levels than larger particles of the same type graphite.

An oxidation-resistant graphite can be prepared by treating a high purity natural or synthetic, non-expanded graphite in an inert atmosphere at a high temperature, for example, greater than about 2500° C. or greater than about 3000° C. It is believed that by treating a high purity synthetic or natural graphite at a high graphitization temperature for an extended period of time, for example, 48 hours, a graphite having a higher degree of crystallinity, a larger average crystallite size, fewer surface defects, a lower specific surface area, and a higher chemical purity (e.g., lower ash content) than the starting graphite can be produced. In some embodiments, the maximum ash content is less than about 0.1% by weight, for example, less than about 0.05% by weight. Additional heat-treatment of a small particle graphite after mechanical grinding can decrease the level of surface and lattice defects generated during size reduction thereby producing a small particle graphite having a higher level of oxidation resistance.

Mixtures of conductive additives can be used, such as a mixture of graphite particles (e.g., including from about 10 to about 100 weight percent of oxidation-resistant graphite), carbon micro-fibers, and carbon nanofibers. Oxidation-resistant synthetic or natural graphites are available from, for example, Timcal, Ltd., Bodio, Switzerland (e.g., Timrex® SFG6, SFG10, SFG15, SFG44, SLP30) or Superior Graphite Co., Chicago, Ill. (e.g., 2939 APH-M). Highly oxidation-resistant small particle synthetic graphites are available from Timcal, Ltd., Bodio, Switzerland (e.g., Timrex® SFG4HT, SFG6HT, SFG15HT). Carbon micro-fibers are available commercially from, for example, Showa Denko Carbon Sales, Inc., Ridgeville, S.C. (e.g., VGCF®-H, VGCF®-S). Carbon nanofibers are described, for example, in commonly-assigned U.S. Ser. No. 09/658,042, filed Sep. 7, 2000 and U.S. Ser. No. 09/829,709, filed Apr. 10, 2001. Cathode 12 can include from about 3 to about 35 percent by weight of conductive additive. For example, cathode 12 can include greater than or equal to about 3, 5, 10, 15, 20, 25, or 30 percent by weight of the conductive additive; and/or less than or equal to about 35, 30, 25, 20, 15, 10 or 5 percent by weight of the conductive additive.

An optional binder can be added to enhance the structural integrity of cathode 12. Examples of binders include polyethylene powders, polyacrylamides, Portland cement, and various fluorocarbon resins, such as polyvinylidenefluoride (PVDF) and polytetrafluoroethylene (PTFE). An example of a polyethylene binder is sold under the tradename Coathylene HA-1681 (available from Hoescht). Cathode 12 can include, for example, from about 0.1 percent to about 2 percent by weight of binder. Cathode 12 also can include other optional additives. For example, addition of small amounts (e.g., about 0.01 to about 1 weight percent) of a fluoride salt, e.g., potassium fluoride or barium fluoride, to the cathode can improve cathode utilization.

The electrolyte solution also is dispersed throughout cathode 12, e.g., at about 5 to 7 percent by weight. Weight percentages provided herein are determined after the electrolyte solution is dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 20 and about 45 percent by weight of the alkali metal hydroxide, such as about 7 N, 8.5 N, and 9 N KOH (i.e., about 30, 35, and 37 percent by weight KOH, respectively). In some embodiments, the electrolyte solution also can include up to about 6 percent by weight zinc oxide, e.g., about 2 percent by weight zinc oxide.

In some embodiments, the electrolyte solution is formulated such that dissolution of cathode active material in the electrolyte is minimized. In strongly alkaline electrolyte solutions, for example, 7 N KOH or 9 N KOH, some Bi(V)-containing metal oxide cathode active materials can dissolve and/or be unstable relative to decomposition to Bi(III)-containing materials. Some of the Bi(V)-containing metal oxides are somewhat soluble (e.g., <800 ppm Bi, <400 ppm Bi, <100 ppm Bi by weight) even at ambient temperature in 7 N or 9N KOH electrolyte solution. Without wishing to be bound by theory, it is believed that the Bi(V)-containing metal oxides typically do not oxidize the alkaline electrolyte at ambient temperature, but instead can undergo an ion-exchange process, e.g., with $K^+$ ions of the KOH electrolyte. In the case of $MgBi_2O_6$, $ZnBi_2O_6$, and $AgBiO_3$, for example, $Mg^{2+}$, $Zn^{2+}$, and $Ag^+$ ions can be exchanged completely by potassium ions to form another Bi(V)-containing compound, potassium bismuthate (e.g., $KBiO_3$). Even though the solubility of $KBiO_3$ can be substantially less than that of some un-exchanged Bi(V)-containing metal oxide cathode active materials, the theoretical volumetric capacity (i.e., $Ah/cm^3$) of $KBiO_3$ is about 70% that of $MgBi_2O_6$ and $ZnBi_2O_6$ and about 60% of that of $AgBiO_3$ cathode active materials.

Other deleterious effects can occur as a result of the dissolution of the cathode active material. For example, dissolution of the cathode active material is in effect a cathode self-discharge process that can diminish total cell capacity. Further, dissolved highly oxidized transition metal ions can diffuse to the zinc anode where they can be chemically reduced by zinc and deposited on the surface of the zinc as metallic particles, e.g., bismuth. The zinc anode can be oxidized and, in effect, undergo self-discharge, which can further diminish the total capacity of a balanced cell, sometimes more quickly than by cathode self-discharge processes because reduction of a highly oxidized metal species to its metallic state can consume more equivalents of zinc than would be consumed during normal cell discharge. This anode self-discharge process can cause an increase in hydrogen gassing rate since the metal, e.g., bismuth, deposited on the surface of the zinc particles can result in a lower hydrogen over-potential than zinc or zinc-based alloy. A larger volume of hydrogen gas can be evolved than typically would be expected from the zinc anode in the absence of dissolved highly oxidized metal species and gas pressure can build up inside the cell resulting in cell leakage. Metal particles formed by reduction of the soluble metal species can deposit on the zinc particles so as to form dendrites that can grow outwardly from the surface of the zinc particles toward the cathode, penetrate the separator, and cause an internal short-circuit in the cell. As a result, shelf life of an alkaline cell having a soluble cathode active material can be severely degraded, especially during storage at elevated temperatures, e.g., 60° C.

Accordingly, the electrolyte can contain one or more soluble additives to decrease solubility of the electroactive cathode material in the electrolyte. Without wishing to be bound by theory, it is believed that the additive is capable of reducing (e.g., suppressing) ion exchange of metal ions in the cathode active material by $K^+$ ions of the KOH-containing electrolyte, thereby suppressing formation of $KBiO_3$, inhibiting dissolution of the cathode active material, and limiting the concentration of $Bi^{5+}$ ionic species in the electrolyte. As a result, the overall stability of a Bi(V)-containing metal oxide cathode active material in contact with a KOH-containing electrolyte at elevated temperatures as well as the discharge performance of the cell, e.g., after storage for an extended period of time at ambient temperature, can be enhanced.

The soluble additive can be an alkali metal compound, an alkaline earth metal compound, a transition metal compound, a main group metal compound, a lanthanide compound, or a mixture thereof. Potassium fluoride is an example of an alkali metal compound. Examples of alkaline earth metal compounds include salts and oxides, such as magnesium fluoride, barium hydroxide, barium oxide, barium fluoride, barium carbonate, barium sulfate, strontium hydroxide, strontium oxide, strontium fluoride, calcium hydroxide, calcium oxide, calcium fluoride, and mixtures thereof. Barium hydroxide in the electrolyte also can serve to decrease hydrogen gassing by the zinc anode during storage, e.g., at elevated temperatures. Examples of lanthanide compounds include lanthanum hydroxide, lanthanum oxide, cerium hydroxide, praseodymium hydroxide, neodymium hydroxide, and europium hydroxide. Zinc oxide is an example of a transition metal compound additive. Examples of main group metal compounds include aluminum hydroxide, aluminum oxide, gallium hydroxide, gallium oxide, indium hydroxide, indium oxide, indium oxyhydroxide, and bismuth hydroxide. Addition of barium fluoride to an alkaline electrolyte solution (e.g., 6 M KOH+0.6 M LiOH) at a concentration of from about 0.0001 to 0.001M can improve cycle life and cycling efficiency, e.g., as disclosed in U.S. Pat. No. 5,681,672 for rechargeable alkaline nickel-zinc cells. Addition of potassium fluoride alone (e.g., 18 to 30 weight percent) or a mixture of potassium fluoride (e.g., about 0.5 to 4 M) and potassium carbonate (e.g., about 0.5 to 4 M) to an alkaline electrolyte solution (e.g., 3 M KOH+0.5 M LiOH) can improve capacity retention and high rate performance, e.g., as disclosed in U.S. Pat. Nos. 4,247,610 and 5,302,475 for rechargeable alkaline nickel-zinc cells.

The soluble additive(s) can be included in cathode 12, in the electrolyte, and/or in anode 14, in any combination. For example, the additive(s) can be included in the form of a solid, a solution (e.g., a saturated solution), or in both forms. In some embodiments, the electrolyte is saturated with the additive(s). The saturation concentration of the electrolyte additive depends upon the particular additive as well as the concentration of the electrolyte. For example, the saturation concentration of barium hydroxide in 9 N KOH electrolyte solution can be about 6200 ppm Ba by weight after 10 days at 60° C. whereas that of barium fluoride can be about 1265 ppm Ba by weight. By comparison, the saturation concentration of aluminum hydroxide in 7 N KOH electrolyte solution can be about 13 percent by weight (e.g., as $Al_2O_3$). However, a high concentration of aluminum hydroxide can increase viscosity of the electrolyte solution resulting in a substantial decrease in ionic conductivity. For example, the ionic conductivity of a saturated solution of barium hydroxide in 9 N KOH electrolyte at 20° C. can be about 0.53 Siemens/cm, whereas the ionic conductivity of a saturated solution of aluminum hydroxide in 7 N KOH electrolyte can be about 0.19 Siemens/cm. For comparison, the ionic conductivity of 9 N KOH electrolyte at 20° C. without any additive can be about 0.58 Siemens/cm.

Anode 14 can be formed of any of the standard zinc-based materials used in alkaline battery anodes. For example, anode 14 can be a gel that includes zinc metal particles and/or zinc alloy particles, a gelling agent, and minor amounts of additives, such as a gassing inhibitor. In addition, a portion of the electrolyte solution is dispersed throughout the anode.

The zinc particles can be any of the zinc-based particles used in gelled zinc anodes. The zinc-based particles can be formed of a zinc-based material, for example, zinc or a zinc alloy. The zinc alloy typically is composed primarily of zinc and can include indium and/or bismuth. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The anode may include, for example, by weight between about 60% and about 80%, between about 62% and 75%, between about 62% and about 72%, or between about 67% and about 71% of zinc-based particles. The anode can include less than about 68 percent, 64 percent, 60 percent, 55 percent or 45 percent by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a 200 mesh size sieve (i.e., a sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small enough to pass through a 325 mesh size sieve (i.e., a sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or mixtures of zinc fines and dust (e.g., from about 35 to about 75 weight percent) with larger size (e.g., −20 to +200 mesh) zinc-based particles. A mixture of zinc-based particles can provide good overall performance with respect to rate capability of the anode for a broad spectrum of drain rate requirements as well as provide good storage characteristics. To improve performance at high discharge rates after storage, a substantial percentage of zinc fines and/or zinc dust can be included in the anode.

Examples of gelling agents include polyacrylic acids, grafted starch materials, salts of polyacrylic acids, polyacrylates, carboxymethylcellulose or combinations thereof. Examples of polyacrylic acids are Carbopol™ 940 and 934 (available from B.F. Goodrich) and Polygel™ 4P (available from 3V), and an example of a grafted starch material is Waterlock™ A221 (available from Grain Processing Corporation, Muscatine, Iowa). An example of a salt of a polyacrylic acid is Alcosorb™ G1 (available from Ciba Specialties). The anode may include, for example, from 0.1 percent to about 1 percent gelling agent by weight.

Gassing inhibitors can be inorganic materials, such as bismuth, tin, lead and indium included in the zinc-based alloys or soluble compounds, such as indium acetate, indium hydroxide, indium sulfate, bismuth oxide, and barium hydroxide, included in the anode. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the designs used for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. The separator can include a layer of an ion permeable membrane material or a layer of adhesive between the non-woven, non-membrane layers. The layers can be substantially devoid of fillers, such as inorganic particles. In some embodiments, the separator can include inorganic particles.

In other embodiments, separator 16 can include at least one layer of cellophane and a layer of non-woven material. The separator also can include an additional layer of non-woven material. The cellophane layer can be adjacent to cathode 12. The non-woven material can contain from about 78 weight percent to about 82 weight percent polyvinylalcohol (PVA) and from about 18 weight percent to about 22 weight percent rayon and a trace amount of surfactant. Non-woven materials are available from PDM under the tradename PA25. An example of a separator including a layer of cellophane laminated to a non-woven material is Duralam™ DT225 (Duracell® Inc., Aarschot, Belgium).

Separator 16 can be an ion-permeable ion-selective separator. The ion-selective separator can include an ion-selective membrane or coating or a micro-porous membrane that can effectively limit the diffusion rate of soluble $Bi^{3+}$ and $Bi^{5+}$-containing ionic species through the separator during discharge and storage of the cell. Furthermore, in some embodiments, separator 16 can limit the diffusion of soluble zincate ion, e.g., $[Zn(OH)_4]^{2-}$ from the anode to the cathode. Zincate ion can interfere with the reduction and oxidation of the cathode active material, thereby resulting in a loss of coulombic efficiency and ultimately in decreased shelf life. The separator can include a polymeric substrate having a wettable cellulose acetate-coated polypropylene microporous membrane (e.g., Celgard® 3559, Celgard® 5550, or Celgard® 2500) and an ion-selective coating applied to at least one surface of the substrate. Ion-selective coatings include polyaromatic ethers (such as a sulfonated derivative of poly(2, 6-dimethyl-1,4-phenyleneoxide)) having a finite number of recurring monomeric phenylene units each of which can be substituted with one or more lower alkyl or phenyl groups and a sulfonic acid or carboxylic acid group. The separator also can include a substrate such as cellophane, nylon (e.g., Pellon® sold by Freundenburg, Inc.), a microporous polypropylene membrane (e.g., Celgard® 3559 sold by Celgard, Inc.) or a composite material including a dispersion of a carboxylic ion-exchange material in a microporous acrylic copolymer membrane (e.g., PD2193 sold by Pall-RAI, Inc.). Examples of separators are described in U.S. Pat. Nos. 5,798,180; 5,910, 366; and 5,952,124.

An ion-selective separator can be a laminated sheet including multiple layers of ion-selective membranes including, for example, one or more cellophane layers, one or more grafted, low-density polyethylene microporous membranes, one or more grafted, high-density polyethylene microporous membranes, and/or one or more optional non-woven layers. An example of a commercial, multi-layer separator includes a laminated separator consisting of a single cellophane layer laminated between two layers of grafted, high-density polyethylene microporous membranes (e.g., SLO-083(3) from Shanghai ShiLong High-Tech Co., Ltd.). Another example of a commercial, multi-layer separator includes a laminated separator consisting of a single grafted, low-density polyethylene microporous membrane laminated between two cellophane layers (e.g., CN2052(3) from Shanghai ShiLong High-Tech Co., Ltd.). An ion-selective separator sheet can include a microporous membrane laminated to a non-woven layer as well as to a cellophane layer. For example, a single grafted, low-density polyethylene microporous membrane can be laminated between a single cellophane layer and a single layer of non-woven material, (e.g., PA25). Electrical impedance of such an ion-selective separator sheet can be lower than that of a laminated ion-selective separator including two cellophane layers or two microporous membranes. A laminated multilayer separator having a single cellophane layer, a single microporous membrane layer, and a single non-woven layer can be as effective as commercial multi-layer separators including multiple cellophane or microporous membrane layers at limiting the diffusion rate of soluble $Bi^{3+}$ and $Bi^{5+}$ containing ionic species from the cathode to the anode.

In other embodiments, separator 16 can include one or more ion-trapping layers. The ion-trapping layer via a chemical reaction can convert a soluble bismuth ionic species into bismuth metal or another bismuth-containing species that is less soluble in the electrolyte. The layer can include inorganic particles, such as metal oxide nanoparticles, for example, $ZrO_2$ and $TiO_2$ that can form an insoluble compound or an insoluble complex with a soluble bismuth species to limit diffusion of soluble $Bi^{3+}$ and $Bi^{5+}$ containing ionic species through the separator to the anode. One or more ion-trapping layers can be used to absorb bismuth-containing ionic species. Separators having one or more ion-selective layers also can include one or more ion-trapping layers. Examples of adsorptive separators are disclosed in commonly assigned U.S. application Ser. No. 10/682,740, filed on Oct. 9, 2003, incorporated by reference in its entirety. Other ion-trapping layers have been disclosed in U.S. Pat. Nos. 5,026,617; 6,706, 442 and U.S. Application Publication Nos. 2005/0079424 A1; 2005/0084761 A1. In addition to inorganic particles, an ion-trapping layer can include organic compounds such as metal sequestering agents, chelating agents, and complexing agents including, for example, cyclodextrin compounds as well as linear chain polyols including, for example, xylitol, that are stable in alkaline electrolyte solution. Such organic metal ion-complexing compounds typically are grafted or otherwise bonded to a polymeric substrate that is stable and insoluble in the electrolyte. A grafted polymer can be applied as a coating to a non-woven layer or to a permeable membrane. An example of an ion-complexing separator including a cyclodextrin-modified coating on the surface of a non-woven hydrophobic polymeric substrate is disclosed in U.S. Pat. No. 6,613,703.

In some embodiments, separator 16 can include alkaline earth metal fluoride particles, for example, calcium fluoride, magnesium fluoride, strontium fluoride or barium fluoride, that are essentially insoluble in alkaline electrolyte but are embedded in a regenerated cellulose film to dissolve slowly in the electrolyte to liberate the electrolyte additive as disclosed in U.S. Pat. No. 6,682,854.

Separator 16 can include, in some embodiments, one or more non-microporous polymer-based solid gel membranes that contain ionic species within the solution phase of the gel and that are conductive to anions or cations. For example, a membrane can include a polymer-based gel or film portion having an electrolyte in solution with the polymerization product of a polymerization initiator and one or more water-soluble ethylenically unsaturated amide or acid monomers, such as methylenebisacrylamide, acrylamide, methacrylic acid, acrylic acid, 1-vinyl-2-pyrrolidinone, or combinations thereof. Examples of electrolytes include potassium hydroxide, sodium hydroxide, lithium hydroxide, or combinations thereof. Alternatively or additionally, the ionic species may come from a neutral aqueous solution prepared from combinations of ammonium chloride, potassium sulfate, and/or sodium chloride. Separator 16 can include a reinforcing element, such as an ionic polymer, e.g., polysulfone (anionic) or poly(sodium-4-styrenesulfonate). The addition of the reinforcing element can enhance the ionic conductivity and mechanical strength of the separator. In embodiments, a crosslinking agent such as methylenebis-acrylamide or ethylenebis-acrylamide can be used. Other embodiments of separator 16 and methods of making a separator are described in U.S. Pat. No. 6,358,651.

In general, separator 16 can include any one or more layers or separator sheets described above, in any combination. The total thickness and composition of the resulting multi-layer separator stack can be selected to provide sufficiently low resistivity (e.g., impedance) in order to minimize degradation of cell performance at high discharge rates.

Cell housing 18 can be any housing used for primary alkaline batteries. The housing can include an inner metal wall and an outer electrically non-conductive material such as heat shrinkable plastic label. The housing can serve as the cathode current collector. A thin layer of conductive material can be disposed between the inner wall of the housing and cathode 12. The layer may be disposed along the inner surface of the wall, along the circumference of cathode 12 or both. The layer can include a film-forming binder. The conductive material can be, for example, a carbonaceous material. Exemplary materials for forming conductive layers include LB1000 (Timcal, Ltd.), Eccocoat 257 (W. R. Grace & Co.), Electrodag 109 (Acheson Colloids, Co.), Electrodag 112 (Acheson) and EB0005 (Acheson). In some embodiments, oxidation of the carbonaceous material in the conductive layer by a Bi(V)-containing metal oxide cathode active material can increase contact resistance between the cathode and the housing thereby degrading high-rate discharge performance, especially after storage. To minimize oxidative degradation, the conductive layer can include an oxidation-resistant graphite, e.g., Timrex® SFG15 (Timcal, Ltd.) as well as an oxidation-resistant film-forming binder. Methods of applying conductive layers are disclosed in, for example, Canadian Patent 1,263,697, which is hereby incorporated by reference.

Anode current collector 20 is made from a suitable metal, such as brass. Seal 22 can be made, for example, of nylon.

Battery 10 can be assembled by conventional methods. Battery 10 can be, for example, AA, AAA, AAAA, C, or D battery. In other embodiments, battery 10 can be non-cylindrical, such as coin cells, button cells, prismatic cells, flat cells, pocket cells, pouch cells, bag cells or racetrack-shaped cells.

The following examples are illustrative and not intended to be limiting.

Example 1

Preparation of CoOOH-Coated Magnesium Bismuthate: Magnesium Bismuthate, $MgBi_2O_6$, was prepared according to the method taught in Example 2 of commonly assigned U.S. patent application Ser. No. 10/913,922 filed Aug. 6, 2004.

In order to increase the electrical conductivity of a cathode formed of the $MgBi_2O_6$ powder, a thin coating of CoOOH was deposited onto the surface of the $MgBi_2O_6$ particles. An aqueous slurry containing 9.43 g $MgBi_2O_6$ powder mixed with a small amount of de-ionized water was added with stirring to 50 ml of aqueous 0.8 M sodium peroxydisulfate, $Na_2S_2O_8$ (Alfa-Aesar, ≧98%) solution, and the mixture was stirred and heated at 74-76° C. in a 500 ml flask. Twenty (20) ml of aqueous 0.175 M cobalt sulfate hydrate ($CoSO_4 \cdot 0.6.9H_2O$, Alfa-Aesar) solution was added, and the mixture was stirred for about 15 minutes. Next, about 40 ml of 5N KOH solution was added to the mixture and stirring was continued at about 74-76° C. for an additional 45 minutes. The mixture was cooled to room temperature and a dark brown solid was separated by vacuum filtration. The solid was washed thoroughly with de-ionized water and dried in air at 60° C. for about 24 hours. The specific surface area determined by the B.E.T. $N_2$ adsorption isotherm method increased from about 2 to 7 $m^2/g$ for uncoated $MgBi_2O_6$ to about 9 to 15 $m^2/g$ for the CoOOH-coated $MgBi_2O_6$. The true density measured by He pycnometer decreased from about 7.2 $g/cm^3$ for uncoated $MgBi_2O_6$ to about 6.7 $g/cm^3$ for CoOOH-coated $MgBi_2O_6$.

Example 2

Discharge of cobalt oxyhydroxide-coated magnesium bismuthate: Fresh discharge performance of CoOOH-coated $MgBi_2O_6$ of Example 1 was evaluated in 635-type alkaline button cells. Cathode mixtures were prepared by thoroughly mixing about 7.50 g $MgBi_2O_6$ (75 wt %) with 2.00 g of an oxidation-resistant, synthetic graphite (20 wt %) (e.g., Timrex® SFG-15; Timcal, Ltd., Bodio, Switzerland) and 0.50 g of 9 N KOH electrolyte solution saturated with about 0.6 wt % barium hydroxide (5 wt %) with a mortar and pestle. A cathode disk weighing about 0.40 g was pressed directly onto a fine nickel wire grid welded to the bottom of the cathode can using an applied pressure of about 5000 lbs. To minimize diffusion of soluble bismuth species into the anode, two sheets of laminated multilayer separator sheets were employed. One sheet included a layer of cellophane laminated onto a non-woven layer (e.g., Duralam™ DT-225; Duracell®). The other sheet included a layer of cellophane laminated between two layers of grafted, high-density, polyethylene microporous membranes (e.g., SL083; Shanghai Shi Long High-Tech). Both sheets were wetted with 9 N KOH electrolyte solution and positioned on top of the cathode disk such that one of the polyethylene layers of the latter separator sheet was in contact with the cathode and the other polyethylene layer in contact with the cellophane layer of the other separator sheet. A plastic seal was positioned on the anode can and 2.50 g of zinc anode slurry containing 60 wt % zinc alloy particles, 39.5 wt % 9N KOH electrolyte solution, and about 0.5 wt % gelling agent was dispensed into the anode can. The cells were closed and hermetically sealed by mechanical crimping.

Cells were held for 24 hours at room temperature to ensure thorough wetting of the cathodes and separators. Cells were discharged fresh at a constant low drain rate of 10 mA/g (i.e., C/20) and at a constant high drain rate of about 140 mA/g (i.e., 0.7 C) to a cutoff voltage of 0.8 V as depicted in curve (b) of FIG. 6A. The average CCV at the low drain rate was about 1.68 V. The total specific capacity at the low drain rate was about 154 mAh/g, which corresponds to about 77 percent of the theoretical four-electron capacity of about 199 mAh/g. The total specific capacity at the high drain rate was about 135 mAh/g, which corresponds to about 68% of the theoretical capacity. Average CCV at the high drain rate was about 1.49 V.

Comparative Example 1

Discharge of cobalt oxyhydroxide-coated β-nickel oxyhydroxide: Fresh discharge performance of cobalt oxyhydroxide-coated β-nickel oxyhydroxide was evaluated in alkaline button cells. Cathode mixtures were prepared by mixing about 2.25 g CoOOH-coated β-nickel oxyhydroxide (75 wt %) (e.g., Kansai Catalyst Co.) with 0.6 g of an oxidation-resistant, synthetic graphite (20 wt %) (e.g., Timrex® SFG-15; Timcal, Ltd., Bodio, Switzerland), and 0.15 g of 9N KOH electrolyte solution saturated with about 0.6 wt % barium hydroxide (5 wt %) using a mortar and pestle. Button cells were assembled in the same manner as described in Example 2. The same two multilayer separator sheets were positioned with the same relative orientation with respect to the cathode as in the cells of Example 2. All cells were stored for 24 hours at room temperature prior to discharge, then discharged at a constant low drain rate of 10 mA/g (i.e., C/30) and a constant high drain rate of about 140 mA/g (i.e., C/2) to a cutoff voltage of 0.8 V as depicted in curve (a) of FIG. 6A. The average CCV at the low drain rate was about 1.67 V. The total specific capacity at the low drain rate was about 223 mAh/g, which corresponds to about 76 percent of the theoretical one-electron capacity of about 292 mAh/g. The total specific capacity at the high drain rate was about 197 mAh/g, which corresponds to about 67% of the theoretical capacity. Average CCV at the high drain rate was about 1.51 V.

Example 3

Discharge of mixtures of cobalt oxyhydroxide-coated β-nickel oxyhydroxide and cobalt oxyhydroxide-coated magnesium bismuthate: Fresh discharge performance of cathode mixtures containing CoOOH-coated $MgBi_2O_6$ of Example 2 and CoOOH-coated β-NiOOH of Comparative Example 1 admixed in various weight ratios was evaluated in alkaline button cells. Admixtures containing weight ratios of CoOOH-coated $MgBi_2O_6$ to CoOOH-coated β-NiOOH of 5:1, 2:1, 1:1, 1:2, and 1:5 were included in the cathodes of the cells of Examples 3a, 3b, 3c, 3d, and 3e, respectively. Cathode mixtures were prepared by mixing 7.50 g of each cathode admixture (75 wt %) with 2.00 g of an oxidation-resistant, synthetic graphite (e.g., Timrex® SFG-15; Timcal, Ltd., Bodio, Switzerland), and 0.50 g of 9N KOH electrolyte solution saturated with about 0.6 wt % barium hydroxide using a mortar and pestle.

Alkaline button cells were assembled in the same manner as described in Example 2. For each of the cells of Examples 3a-e, the same combination of two separator sheets were positioned in the same relative orientation with respect to the cathodes as in the cells of Example 2. All cells were stored for 24 hours at room temperature prior to discharge, and discharged at a constant low rate of 10 mA/g and a constant high rate of about 140 mA/g to a 0.8 V cutoff voltage.

All of the cells with cathodes including mixtures of CoOOH-coated $MgBi_2O_6$ and CoOOH-coated β-NiOOH discharged at nearly the same average CCV as of about 1.65 V at the low rate as shown in FIG. 6A. Total specific capacity at the low discharge rate ranged from about 160 to 210 mAh/g for cells with cathodes including increasing amounts of CoOOH-coated β-NiOOH. At the low discharge rate, increasing the amount of CoOOH-coated β-NiOOH relative to CoOOH-coated $MgBi_2O_6$ increased the value of the total specific capacity (i.e., mAh/g) proportional to the amount of NiOOH added. For example, a cell with a cathode including a mixture of CoOOH-coated $MgBi_2O_6$ and CoOOH-coated β-NiOOH in a 2:1 weight ratio had a specific capacity of about 180 mAh/g, as depicted in curve (c) of FIG. 6A.

At the high discharge rate, increasing the amount of β-NiOOH relative to $MgBi_2O_6$ increased the total specific capacity (i.e., mAh/g) proportional to the amount of β-NiOOH added. The total capacity of cells with cathodes including mixtures of β-NiOOH and $MgBi_2O_6$ at the high discharge rate ranged from about 150 to 200 mAh/g, as given in FIG. 7.

Volumetric capacities also were calculated (e.g., see FIG. 7) for the cells of Example 3 from the experimentally determined specific capacities and interpolated densities for the mixtures based on actual measured (i.e., helium pycnometer) densities of 6.72 g/cm$^3$ for CoOOH-coated $MgBi_2O_6$ and 4.1 g/cm$^3$ for CoOOH-coated β-NiOOH. For example, at the low discharge rate, cells of Example 3b with cathodes including a 2:1 weight ratio of CoOOH-coated $MgBi_2O_6$ to CoOOH-coated β-NiOOH (i.e., 50 wt % $MgBi_2O_6$ to 25 wt % NiOOH based on total cathode weight) had volumetric capacities about 17% greater than those of Comparative Example 1 including only CoOOH-coated β-NiOOH and about 3% greater than those of Example 2 including only CoOOH-coated $MgBi_2O_6$, as given in FIG. 7. At the high discharge rate, the differences in volumetric capacity were less significant.

Comparative Example 2

Discharge of electrolytic manganese dioxide: Fresh discharge performance of EMD was evaluated in alkaline button cells. A cathode mixture was prepared by blending 7.50 g (75 wt %) of EMD (e.g., Trona D; Kerr-McGee) with 2.00 g of an oxidation-resistant, synthetic graphite (e.g., Timrex® SFG-15; Timcal, Ltd., Bodio, Switzerland), and 0.50 g of 9N KOH electrolyte solution with a mortar and pestle. All the cells were held for 24 hours at room temperature prior to discharge and then discharged at a constant low rate of about 10 mA/g (i.e., C/30) and a constant high rate of about 140 mA/g (i.e., C/2) to a cutoff voltage of 0.8 V. Average CCV at the low discharge rate was about 1.2 V. Specific capacity at the low discharge rate was about 287 mAh/g, which corresponds to about 93% of the 1-electron theoretical specific capacity of 307 mAh/g, as shown in curve (b) of FIG. 4. Specific capacity at the high discharge rate was about 182 mAh/g, which corresponds to about 59% of the theoretical specific capacity.

Example 4

Preparation of cubic-silver bismuthate, $AgBiO_3$: A cubic phase silver bismuthate can be prepared by treating hydrated potassium bismuthate, $KBiO_3.xH_2O$ ($1.1 \leq x \leq 1.4$) with an aqueous solution of silver nitrate, $AgNO_3$, at room temperature. Potassium bismuthate can be prepared by adding $NaBiO_3.xH_2O$ to an oxidizing melt of KOH and potassium superoxide, $KO_2$. A mixture consisting of 125 g KOH (Fisher, ACS reagent) and 5.0 g $KO_2$ (Alfa Aesar, 96.5%) was placed in a 125 ml PTFE beaker and heated to 250° C. in air to form the melt. In a single portion, 30 g of $NaBiO_3.0.1.37H_2O$ (Alfa Aesar, ACS Reagent) was added to the melt and the resulting mixture held at 250° C. for about 1 hour. The melt was rapidly quenched by pouring into about 2 liters of room temperature de-ionized water. A brick red solid was collected by vacuum filtration and washed with several portions of de-ionized water. The washed solid was dried in air at about 60° C. for 24 hours.

The dried solid was characterized by X-ray powder diffraction and thermal analysis. The measured X-ray powder diffraction pattern was consistent with that reported by Trehous et al. (e.g., *Mat. Res. Bull.,* 17, 1235-43 (1982)) for hydrated potassium bismuthate, $KBiO_3.xH_2O$, having a cubic $KSbO_3$-type structure (JCPDS #46-0806). Thermal analysis of the dried solid by DTA/TGA (10° C./min to 600° C.) had a weight loss below 250° C. that can be attributed to loss of the water of hydration (i.e., about 0.6 wt %, corresponding to x=0.1) and decomposition to $K_2O$ and $Bi_2O_3$ accompanied by oxygen loss. The total experimental weight loss of 5.4 wt % is consistent with the calculated weight loss of 5.8 wt % based on anhydrous $KBiO_3$. The specific surface area for the $KBiO_3$ was determined by the B.E.T. $N_2$ adsorption isotherm method as about 2.4 m$^2$/g. The true density for the $KBiO_3$ measured by He pycnometer was about 5.4 g/cm$^3$. The mean average particle size, $D_{50}$ (i.e., cumulative volume distribution) was determined by a laser diffraction method (e.g., by Sympatec Helios) as about 5 microns with a particle size distribution, $D_{10}$ to $D_{90}$, of from about 2 to 10 microns. The laser Fraunhofer diffraction method is described, for example, by M. Puckhaber & S. Röthele in *Powder Handling & Processing*, 11(1), 91-5 (1999).

To 100 ml of 0.25 M $AgNO_3$ aqueous solution (Aldrich, 1.0 N standardized) 4.00 g $KBiO_3.0.1H_2O$ was added, and the mixture was stirred for 24 hours at ambient temperature. A black solid that formed was collected by vacuum filtration, washed thoroughly with de-ionized water, and dried at 60° C. in air for 24 hours. The dried black solid was stored in an amber bottle to prevent decomposition by light.

The dried solid was characterized using X-ray powder diffraction and thermal analysis. The measured X-ray powder diffraction pattern was consistent with that reported by Sharma et al. (e.g., *Indian J. Chem.*, 43A, 11-17 (2004)) for a silver bismuthate, $AgBiO_3$ having the same cubic $KSbO_3$-type structure as $KBiO_3$. However, the characteristic diffraction lines of $KBiO_3$ shifted to higher two-theta diffraction angles consistent with contraction of the unit cell volume due to exchange of $K^+$ ions (e.g., 1.38 Å) by smaller $Ag^+$ ions (e.g., 1.15 Å). Thermal analysis of the dried solid by DTA/TGA (10° C./min to 600° C.) revealed an exothermic peak at about 200° C. that can be attributed to a transition from the cubic to hexagonal phase. Weight loss below 300° C. can be attributed to decomposition of cubic-$AgBiO_3$ to an intermediate ternary Ag/Bi(II)/O phase and finally to Ag metal and $Bi_2O_3$ with oxygen loss. The total experimental weight loss of 6.24 wt % is consistent with the calculated weight loss of 6.58 wt %. The specific surface area was determined by the B.E.T. $N_2$ adsorption isotherm method as about 2.6 $m^2$/g for cubic-$AgBiO_3$. True density was measured by He pycnometer as about 7.8 $g/cm^3$ for cubic-$AgBiO_3$. The mean average particle size, $D_{50}$ (i.e., cumulative volume basis) determined by the laser diffraction method (e.g., Sympatec Helios) was about 5 microns with a particle size distribution, $D_{10}$ to $D_{90}$ of from about 2 to 7.5 microns.

Example 5

Discharge of cubic-silver bismuthate: Fresh discharge performance of the cubic-$AgBiO_3$ of Example 4 was evaluated in alkaline button cells. Cathode mixtures were prepared by thoroughly mixing 75 wt % cubic-$AgBiO_3$ with 20 wt % oxidation-resistant, synthetic graphite (e.g., Timrex® SFG-15; Timcal, Ltd., Bodio, Switzerland), and 5 wt % of 9N KOH electrolyte solution with a mortar and pestle. Cells were fabricated in the same manner as described in Example 2. All cells were stored for 24 hours at room temperature before discharge.

Cells were discharged at a constant low rate of 10 mA/g (i.e., C/22) and a high rate of about 140 mA/g (i.e., 0.65 C) to a cutoff voltage of 0.8 V. OCV prior to cell discharge was about 1.78 V. A discharge curve for button cells with cathodes including cubic-$AgBiO_3$ discharged at the low drain rate is shown in curve (a) of FIG. 4. Total specific capacity at the low discharge rate was about 200 mAh/g, which corresponds to about 91 percent of the theoretical three-electron capacity of 220 mAh/g. Average CCV at the low discharge rate was about 1.50 V. Three distinct voltage plateaus were present in the low-rate discharge curve above 0.8 V appearing at nominal voltages of about 1.60, 1.45, and 0.9 V as shown in curve (a) of FIG. 4. Specific capacity at the high discharge rate was about 183 mAh/g, which corresponds to about 83 percent of the theoretical capacity. Average CCV at the high discharge rate was about 1.18 V. Two distinct voltage plateaus were present in the high-rate discharge curve above 0.8 V appearing at nominal voltages of about 1.45 V and 1.18 V. The 1.45 V plateau contributed about 40% of the total discharge capacity above 0.8 V.

Example 6

Discharge of mixtures of EMD and cubic-$AgBiO_3$: Fresh discharge performance of cathode mixtures including the cubic-$AgBiO_3$ of Example 5 and an electrolytic manganese dioxide admixed in various weight ratios was evaluated in button cells. Cells with cathodes including mixtures having nominal weight ratios of cubic-$AgBiO_3$ to EMD of 9:1, 3:1, 1:1, 1:3, 1:9, 5:95, and 1:99 were fabricated as Examples 6a-g, respectively, as given in FIG. 5. The cathode mixtures were prepared by mixing with a mortar and pestle 7.50 g of each admixture of cubic-$AgBiO_3$ and EMD (75 wt %, Trona D; Kerr-McGee) with 2.00 g of an oxidation-resistant, synthetic graphite (e.g., Timrex® SFG-15; Timcal, Ltd., Bodio, Switzerland), and 0.50 g of 9 N KOH electrolyte solution.

The electrochemical discharge performance of the various mixtures of cubic-$AgBiO_3$ and EMD were evaluated in button cells fabricated in the same manner as described in Example 2. All the cells were stored for at least 24 hours at ambient temperature prior to discharge.

Cells were discharged at room temperature at a constant low rate of about 10 in mA/g and a constant high rate of about 140 mA/g to a 0.8 V cutoff voltage. Total specific capacity at the low discharge rate ranged from about 200 to 351 mAh/g for cells with cathodes including various admixtures of EMD and cubic-$AgBiO_3$. At the low discharge rate, the total specific capacity (i.e., mAh/g) generally increased with increasing EMD content up to a 3:1 weight ratio of EMD to cubic-$AgBiO_3$. At higher weight ratios of EMD to cubic-$AgBiO_3$, the specific capacity decreased. Specific capacities for cells of Examples 6a-g with cathodes including the indicated weight ratios of cubic-$AgBiO_3$ to EMD as well as the corresponding values for cells including only EMD or cubic-$AgBiO_3$ as the cathode active material are given in FIG. 5. For example, cells of Example 6e with cathodes including a mixture of cubic-$AgBiO_3$ and EMD in a 1:9 weight ratio had a specific capacity of about 350 mAh/g as shown in curve (c) of FIG. 4. In comparison, the cells of Example 5 including only cubic-$AgBiO_3$ and the cells of Comparative Example 2 including only EMD had specific capacities of about 200 mAh/g as shown in curve (a) and 287 mAh/g as shown in curve (b), respectively, of FIG. 4. The specific capacity of the cells of Example 6e was about 22% greater than that for the cells of Comparative Example 2 containing only EMD and about 75% greater than that for the cells of Example 5 containing only cubic-$AgBiO_3$. The specific capacities at the high discharge rate did not vary as widely (i.e., about 176±6 mAh/g) with increasing EMD content as given in FIG. 5.

The corresponding volumetric capacities of the cells of this example discharged at low and high rates were calculated from the specific capacities and the interpolated densities of the various admixtures based on the true density (i.e., measured by helium pycnometer) values of 7.98 $g/cm^3$ for cubic-$AgBiO_3$ and 4.45 $g/cm^3$ for EMD and are given in FIG. 5. The highest volumetric capacities at the low discharge rate of about 1.74-1.76 $mAh/cm^3$ were obtained for the cells of Examples 6c and 6d having weight ratios of cubic-$AgBiO_3$ to EMD of 1:1 and 1:3, respectively. This range of volumetric capacity was about 40% greater than that for the cells of Comparative Example 2 including only EMD and about 12% greater than that for the cells of Example 5 including only cubic-$AgBiO_3$. However, at the high discharge rate, the volumetric capacities of the cells of Examples 6a-f typically decreased monotonically with increasing amount of EMD as given in FIG. 5.

Example 7

Discharge of mixtures of electrolytic manganese dioxide and hydrated sodium bismuthate, $NaBiO_3 \cdot xH_2O$ (1.1<x<1.4): Fresh discharge performance of cathode mixtures including the hydrated $NaBiO_3$ and EMD admixed in various weight ratios was evaluated in button cells. The fresh discharge performance of cathode mixtures including a commercial sodium bismuthate (e.g., Spectrum Chemical Mfg. Co., Gardena, Calif.), $NaBiO_3$ and an electrolytic manganese dioxide (Trona-D, Kerr-McGee) admixed in various weight ratios was evaluated in button cells. The average particle size ($D_{50}$) of the commercial $NaBiO_3$ was about 17 microns with a broad, bimodal particle size distribution ($D_{10}$ to $D_{90}$) ranging from about 2.5 to 42.9 microns. The true density of the commercial $NaBiO_3$ measured by He pycnometer ranged between about 4.63 and 4.76 g/cm$^3$. Cells with cathodes including mixtures of EMD and nominally 25%, 10%, and 6% by weight $NaBiO_3$ were fabricated as Examples 7a-c, respectively. Typically, cathode mixtures were prepared by mixing with a mortar and pestle 7.50 g of each mixture of $NaBiO_3$ and EMD (75 wt %) with 2.00 g of an oxidation-resistant, synthetic graphite (e.g., Timrex® SFG-15; Timcal, Ltd., Bodio, Switzerland), and 0.50 g of 9 N KOH electrolyte solution.

Button cells were fabricated in same manner as described in Example 2. All cells were stored for at least 24 hours at ambient temperature prior to discharge. Cells were discharged at room temperature at a constant low rate of about 10 mA/g and a constant intermediate rate of about 50 mA/g to a 0.8 V cutoff voltage. Total specific capacity at the low discharge rate ranged from about 333 to 339 and from 222 to 244 mAh/g at the intermediate discharge rate. Specific capacities of the cells of Examples 7a-c with cathodes including 25, 10 or 6 percent $NaBiO_3$ by weight and corresponding values for other cells with cathodes including only EMD or $NaBiO_3$ are given in FIG. 9. For example, the cells of Example 7c with a cathode including 6 weight percent $NaBiO_3$ had a specific capacity at the low rate of about 339 mAh/g as shown in curve (b) of FIG. 8. This value was substantially greater than that for the cells of Comparative Example 1 of commonly assigned U.S. application Ser. No. 10/716,358 filed Nov. 17, 2003 with cathodes including only $NaBiO_3$ and having a specific capacity of about 20 mAh/g at the low discharge rate (i.e., about 10% of the theoretical 2-electron capacity of 200 mAh/g) and 10 percent greater than that of the cells of Comparative Example 2 including only EMD having a specific capacity of about 309 mAh/g as shown in curve (a) of FIG. 8. At the intermediate discharge rate, the specific capacities of all the cells with cathodes including mixtures of $NaBiO_3$ and EMD were less than that of cells with cathodes including only EMD as given in FIG. 9.

The volumetric capacities of the cells of Example 7 discharged at low and intermediate rates were calculated from the specific capacities and the interpolated densities of the various admixtures based on the true densities (i.e., measured by helium pycnometer) of about 4.59 g/cm$^3$ for $NaBiO_3$ and 4.45 g/cm$^3$ for EMD and are given in FIG. 9. At the low discharge rate, the volumetric capacities were greater for the cells with cathodes including 6 to 10 weight percent $NaBiO_3$ and less for cells with cathodes containing more than 10 weight percent $NaBiO_3$, for example, 25 weight percent $NaBiO_3$ as given in FIG. 9.

Example 8

Preparation and discharge of lithium bismuthate: Lithium bismuthate was prepared by a method similar to that taught for $MgBi_2O_6$ in Example 2 of commonly assigned U.S. patent application Ser. No. 10/913,922 filed on Aug. 6, 2004. To a solution of 2.4 g lithium hydroxide ($LiOH \cdot H_2O$; Alfa Aesar; Technical) in 70 ml deionized water, 4.07 g of sodium bismuthate hydrate ($NaBiO_3 \cdot 1.4H_2O$; Mallinckrodt; ≧80% purity) was added, and the resulting mixture sealed in a PTFE-lined 125 ml pressure vessel. The pressure vessel was heated to 120° C., held at 120° C. for 6 days, and cooled to room temperature before opening.

A solid was separated from the reaction mixture by vacuum filtration. The solid was washed with several portions of deionized water, collected by vacuum filtration, and dried at about 60° C. for 24 hours in air to yield a dark purple powder.

The solid was characterized using x-ray powder diffraction, chemical analysis, and thermal analysis. The x-ray powder diffraction pattern for the solid was consistent with that reported by Sleight et al. for lithium bismuthate, $LiBiO_3$, having an ilmenite-type structure. No residual sodium was detected by SEM/EDS analysis of the powder suggesting nearly complete ion-exchange of sodium by lithium. Thermal analysis of the solid using DTA/TGA (10° C./min to 600° C.) in flowing air revealed a three step weight loss starting at about 300° C. corresponding to consecutive loss of oxygen. The experimentally observed total weight loss of 6.1 weight percent at 550° C. agrees well with the calculated weight loss of 6.1 weight percent corresponding to the reduction of $LiBiO_3$ to $LiBiO_2$ (or $Li_2O+Bi_2O_3$). The specific surface area of $LiBiO_3$ determined by the B.E.T. $N_2$ adsorption isotherm method was about 1.7 m$^2$/g. The true density measured by He pycnometer was about 7.39 g/cm$^3$.

To increase the electrical conductivity of a cathode containing the $LiBiO_3$ powder, a thin coating of CoOOH was deposited onto the surface of the $LiBiO_3$ particles by a process similar to that described in Example 1 for CoOOH-coated $MgBi_2O_6$.

The fresh discharge performance of the CoOOH-coated $LiBiO_3$ was evaluated in alkaline button cells. Cathode mixtures were prepared as described in Example 2 by mixing 75 wt % $LiBiO_3$ with 20 wt % oxidation-resistant, synthetic graphite (e.g., Timrex® SFG-15; Timcal, Ltd., Bodio, Switzerland), and 5 wt % of 9N KOH electrolyte solution with a mortar and pestle. Cells were fabricated in the same manner as described in Example 2. All cells were stored for 24 hours at room temperature prior to discharge.

Cells were discharged at a constant low rate of 10 mA/g (i.e., C/20) and high rate of about 140 mA/g (i.e., 0.7 C) to a 0.8 V cutoff voltage. OCV before discharge was about 1.73 V. Average CCV at the low discharge rate was about 1.67 V. The discharge curve for the low rate is shown in FIG. 10. Total specific capacity at the low discharge rate was about 118 mAh/g, which corresponds to about 58 percent of the theoretical two-electron capacity of 203 mAh/g. Average CCV at the high discharge rate was about 1.20 V. Total specific capacity at the high discharge rate was about 69 mAh/g, which corresponds to only about 34% of the theoretical capacity.

Example 9

Preparation and discharge of CoOOH-coated cubic-silver bismuthate: To increase the electrical conductivity of a cathode including cubic-AgBiO$_3$, a thin coating of CoOOH can be deposited onto the surface of the AgBiO$_3$ particles by a process similar to that described for the MgBi$_2$O$_6$ of Example 1. The specific surface area was determined by the B.E.T. N$_2$ adsorption isotherm method for CoOOH-coated cubic-AgBiO$_3$ as about 4 m$^2$/g. The true density of CoOOH-coated cubic-AgBiO3 measured by He pycnometer was about 7.2 g/cm$^3$. The mean average particle size for CoOOH-coated cubic-AgBiO$_3$, D$_{50}$ (i.e., cumulative volume basis), was determined by the laser diffraction method (e.g., Sympatec Helios) as about 7.8 microns with a particle size distribution, D$_{10}$ to D$_{90}$, of from about 3 to 17 microns.

Cathode mixtures were prepared by mixing 75 wt % CoOOH-coated cubic-AgBiO$_3$ with 20 wt % oxidation-resistant graphite (e.g., Timrex® SFG15), and 5 wt % of 9N KOH electrolyte solution saturated with barium hydroxide. The electrochemical discharge performance of CoOOH-coated AgBiO$_3$ was evaluated in button cells fabricated in same manner as described for CoOOH-coated MgBi$_2$O$_6$ of Example 2. All cells were stored for at least 24 hours at ambient temperature prior to discharge.

Figure 11A:
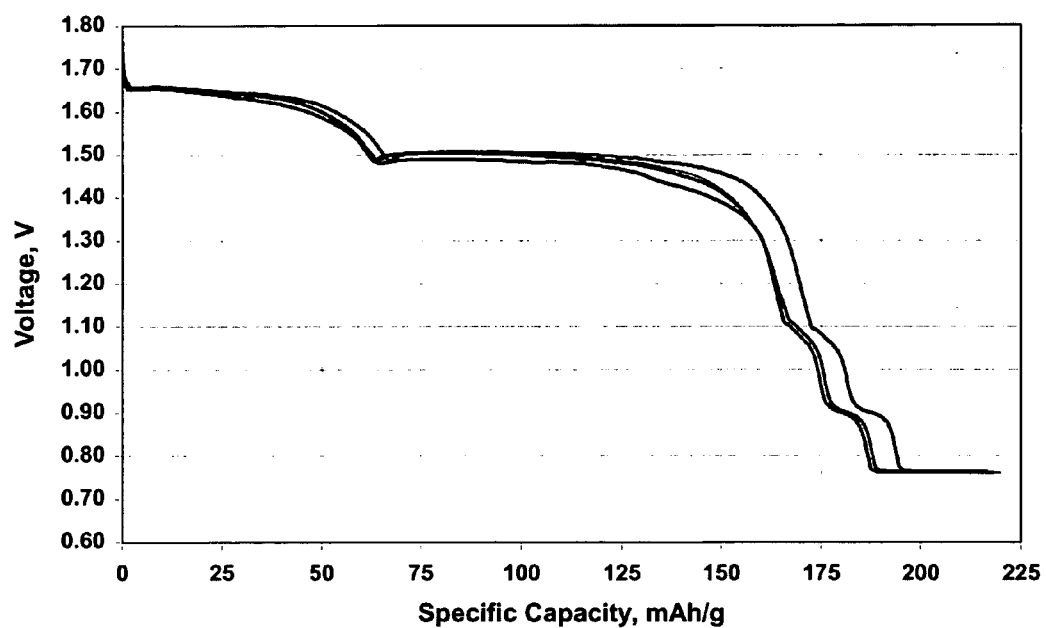
FIG. 11A shows discharge curves for CoOOH-coated cubic-$AgBiO_3$ in an alkaline button cell discharged at 10 mA/g to a 0.8 V cutoff voltage.

Cells were discharged at a constant low rate of 10 mA/g (i.e., C/20) and at a constant high rate of about 140 mA/g (i.e., 0.65 C) to a cutoff voltage of 0.8 V. Average OCV before discharge was about 1.78 V. A discharge curve for cells with cathodes including CoOOH-coated cubic-AgBiO$_3$ discharged at low rate is shown in FIG. 11A. Total specific capacity at the low discharge rate was about 190 mAh/g to a 0.8 V cutoff voltage, which corresponds to about 86 percent of the theoretical three-electron capacity of about 220 mAh/g. Four distinct voltage plateaus were present in the low-rate discharge curve above 0.8 V at nominal voltages of about 1.65, 1.50, 1.10, and 0.9V as shown in FIG. 11A. The 1.50V plateau contributed >50% of the total capacity above 0.8 V. Total specific capacity at the high discharge rate was about 175 mAh/g. Two distinct plateaus were present in the high rate discharge curves above 0.8 V at nominal voltages of about 1.50 and 1.35 V. The 1.35 V plateau contributed nearly 70% of the total capacity above 0.8 V.

Example 10

Preparation and discharge of hexagonal-silver bismuthate: Silver bismuthate, AgBiO$_3$, having a hexagonal, ilmenite-type crystal structure was prepared by the method taught in Example 4 of commonly assigned U.S. patent application Ser. No. 10/913,922 filed on Aug. 6, 2004. The true density of hexagonal-AgBiO$_3$ was measured by He pycnometer as about 6.7 g/cm$^3$. The mean average particle size (D$_{50}$) of hexagonal-AgBiO$_3$ was about 13 microns with a broad, bimodal particle size distribution (D$_{10}$ to D$_{90}$) ranging from about 1.7 to 28.5 microns. To increase electrical conductivity of a cathode containing hexagonal-AgBiO$_3$, a thin coating of CoOOH was deposited onto the surface of the hexagonal-AgBiO$_3$ particles by a process similar to that described in Example 1 for CoOOH-coated MgBi$_2$O$_6$.

The fresh discharge performance of the CoOOH-coated hexagonal-AgBiO$_3$ was evaluated in alkaline button cells. Cathode mixtures were prepared by mixing 75 wt % AgBiO$_3$ with 20 wt % oxidation-resistant, synthetic graphite (e.g., Timrex® SFG-15; Timcal, Ltd., Bodio, Switzerland), and 5 wt % of 9N KOH electrolyte solution with a mortar and pestle. Cells were fabricated in the same manner as described in Example 2. All cells were stored for 24 hours at room temperature prior to discharge.

Figure 11B:
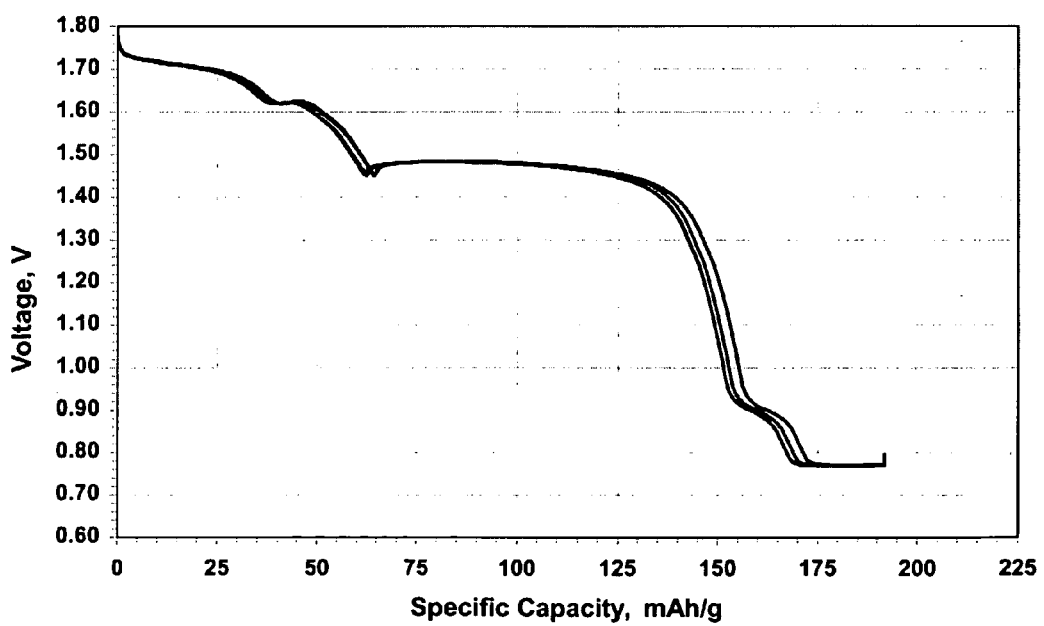
FIG. 11B shows discharge curves for CoOOH-coated hexagonal-$AgBiO_3$ discharged in an alkaline button cell at 10 mA/g to a 0.8 V cutoff voltage.

Cells were discharged at a constant low rate of 10 mA/g (i.e., C/20) and high rate of about 140 mA/g (i.e., 0.65 C) to a 0.8 V cutoff voltage. OCV before discharge was about 1.78 V. A discharge curve for button cells containing CoOOH-coated hexagonal-AgBiO$_3$ discharged at the low rate is shown in FIG. 1B. The average CCV at the low drain rate was about 1.50 V. Total specific capacity at the low rate was about 170 mAh/g, which corresponds to about 77 percent of the theoretical three-electron capacity of 220 mAh/g. Four distinct voltage plateaus were present in the low-rate discharge curve above 0.8 V at nominal voltages of 1.72 V, 1.63 V, 1.48 V, and 0.9 V as shown in FIG. 11B. The 1.50 V plateau contributed about 54% of the total capacity above 0.8 V. Average CCV at the high rate was about 1.20 V. Total specific capacity at the high rate was about 156 mAh/g, which corresponds to about 71% of the theoretical capacity as given in Fig. Only two voltage plateaus were present in the high-rate discharge curve above 0.8 V at nominal voltages of about 1.5 V and 1.2 V.

Example 11

Preparation and discharge of silver bismuthate, Ag$_3$BiO$_3$: A silver bismuthate phase containing only Bi(III) and having the stoichiometry Ag$_3$BiO$_3$ was prepared by a procedure similar to that reported by M. Jansen and co-workers (See, for example, Z. Anorg. Allgem. Chem, 628(6), 1951-4 (2002)). In an agate mortar, 5.968 g Ag$_2$O and 4.0 g Bi$_2$O$_3$ (i.e., 3:2 molar ratio) were intimately mixed. The mixture was added in portions to 80 ml of 50% KOH solution at 90° C. in a 125 ml Teflon beaker having a tightly fitting lid. The mixture was stirred for 6 hours at 90° C. in the dark. An orange-brown solid was separated from the mixture by vacuum filtration. The solid was washed by re-dispersing in de-ionized water and collecting by vacuum filtration several times and finally dried at about 60° C. for 24 hours in air.

The dried solid was characterized by x-ray powder diffraction. The diffraction pattern was consistent with that reported for Ag$_3$BiO$_3$ (e.g., JCPDS# 49-0140).

The electrochemical discharge performance of Ag$_3$BiO$_3$ was evaluated in alkaline button cells. Cathode mixtures were prepared as described for the uncoated cubic silver bismuthate, AgBiO$_3$ of Example 4 by mixing 75 wt % Ag$_3$BiO$_3$ with 20 wt % oxidation-resistant, synthetic graphite (e.g., Timrex® SFG-15; Timcal, Ltd., Bodio, Switzerland), and 5 wt % of 9N KOH electrolyte solution with a mortar and pestle. Cells were fabricated in the same manner as described in Example 2. All the cells were stored for 24 hours at room temperature prior to discharge.

Figure 12A:
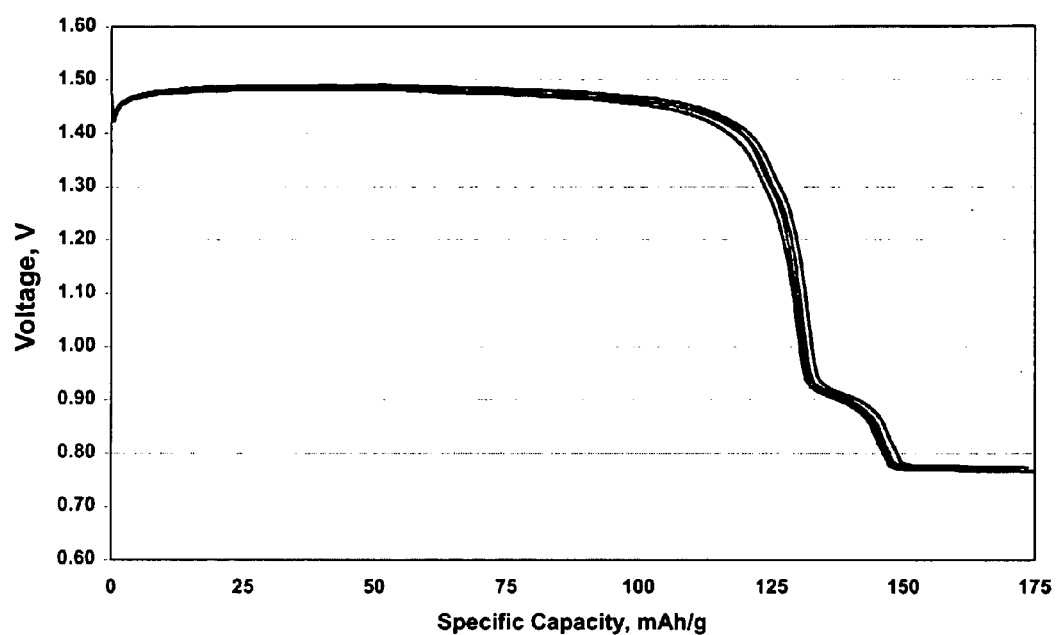
FIG. 12A shows discharge curves for $Ag_3BiO_3$ in an alkaline button cell discharged at 10 mA/g to a 0.8 V cutoff voltage.

Cells were discharged at a constant low rate of 10 mA/g (i.e., C/20) and high rate of about 140 mA/g (i.e., 0.65 C) to a cutoff voltage of 0.8 V. The average OCV was about 1.5 V. A typical discharge curve for button cells containing Ag$_3$BiO$_3$ discharged at the low rate is shown in FIG. 12A. The average CCV at the low discharge rate was about 1.47 V. Specific capacity at the low discharge rate was about 147 mAh/g which corresponds to 100 percent of the theoretical three-electron capacity of 140 mAh/g. Two distinct voltage plateaus were present in the low-rate discharge curve above 0.8 V at nominal voltages of 1.47 V and 0.9 V as shown in FIG. 12A. The specific capacity at the high discharge rate was about 125 mAh/g which corresponds to about 90% of the theoretical capacity. The average CCV at the high discharge rate was about 1.2 V.

Example 12

Preparation and discharge of silver bismuthate, Ag$_2$BiO$_3$: A mixed valent silver bismuthate phase containing both Bi(III) and Bi(V) and having the stoichiometry Ag$_2$BiO$_3$ was prepared by the procedure reported by M. Jansen and co-workers workers (See, for example, Z. Anorg. Allgem. Chem., 628(6), 1951-4 (2002)). $Ag_3BiO_3$ and cubic $AgBiO_3$ (1:1 mole ratio) were the starting materials. In an agate mortar, 2.5 g uncoated cubic-$AgBiO_3$ (prepared as described in Example 4) and 3.978 g $Ag_3BiO_3$ (prepared as described in Example 11) were intimately mixed (i.e., 1:1, m/m). The mixture was added in portions to 80 ml of 50% KOH solution at 90° C. in a 125-ml Teflon beaker having a fitted lid. The mixture was stirred for 6 hours at 90° C. in dark. A brown-black solid was separated from the mixture by vacuum filtration. The solid was washed by re-dispersing in de-ionized water, collecting by vacuum filtration several times, and dried in air at about 60° C. for 24 hours.

The dried solid was characterized by x-ray powder diffraction. The x-ray powder diffraction pattern was consistent with that reported by M. Jansen and co-workers for the $Ag_2BiO_3$ phase.

Figure 13A:
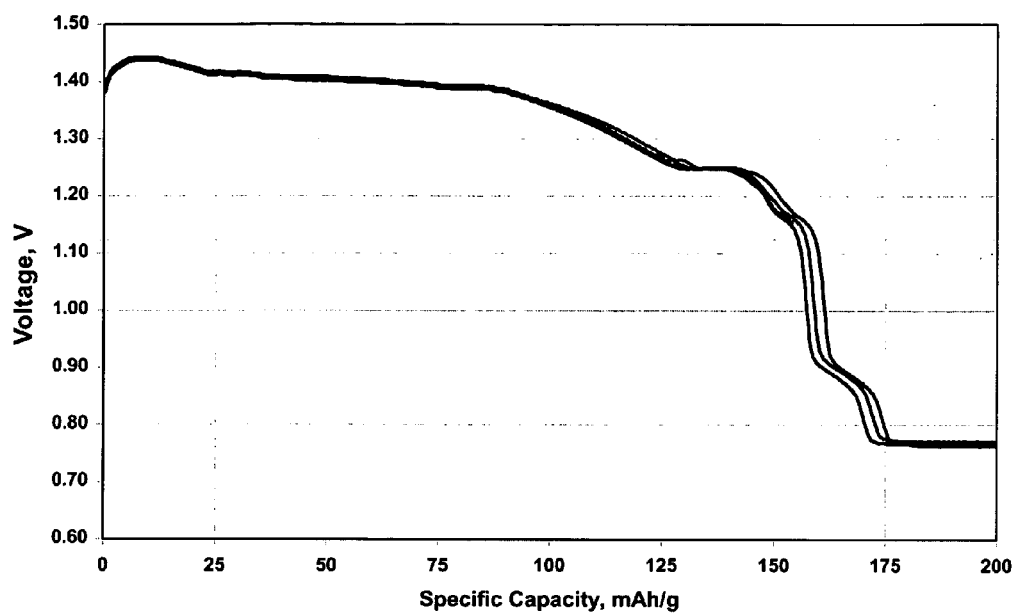
FIG. 13A shows discharge curves for $Ag_2BiO_3$ in an alkaline button cell discharged at 10 mA/g to a 0.8 V cutoff voltage.

The electrochemical discharge performance of $Ag_2BiO_3$ was evaluated in alkaline button cells. Cathode mixtures were prepared as described for the uncoated cubic-$AgBiO_3$ of Example 5 by mixing 75 wt % $Ag_2BiO_3$, 20 wt % oxidation-resistant, synthetic graphite (e.g., Timrex SFG-15; Timcal, Ltd., Bodio, Switzerland), and 5 wt % 9N KOH electrolyte solution with a mortar and pestle. Cells were fabricated in the same general manner as described in Example 2. All the cells were stored for 24 hours at room temperature prior to discharge. Cells were discharged at a constant low rate of 10 mA/g (i.e., C/20) and a high rate of about 140 mA/g (i.e., 0.65 C) to a cutoff voltage of 0.8 V. Average OCV was about 1.4 V. A typical discharge curve for button cells containing $Ag_2BiO_3$ discharged at the low discharge rate is shown in FIG. 13A. The average CCV at the low rate was about 1.40 V. Specific capacity at the low discharge rate was about 173 mAh/g which corresponds to 100 percent of the theoretical 3-electron capacity of 170 mAh/g. Four distinct voltage plateaus were present in the low-rate discharge curve above 0.8 V at nominal voltages of 1.4 V, 1.25 V, 1.15 V, and 0.9 V as shown in FIG. 13A. Specific capacity at the high discharge rate was about 154 mAh/g which corresponds to about 90% of the theoretical capacity. The average CCV at the high discharge rate was about 1.10 V.

Example 13

Preparation of oxidized silver bismuthates, $Ag_3BiO_{3+\delta}$ and $Ag_2BiO_{3+\delta}$: The Bi(III)-containing silver bismuthate, $Ag_3BiO_3$ can be oxidized to $Ag_3BiO_{3+\delta}$ ($0 \leq \delta \leq 1$) with an aqueous peroxydisulfate solution. Similarly, the mixed valence silver bismuthate, $Ag_2BiO_3$ containing Bi(III) and Bi(V) can be oxidized to $Ag_2BiO_{3+\delta}$ ($0 \leq \delta \leq 0.5$) using an aqueous peroxydisulfate solution. For example, 2 g $Ag_3BiO_3$ of Example 11 or 2 g $Ag_2BiO_3$ of Example 12 was added to 80 ml of an alkaline solution, e.g., 9 N KOH, containing excess $K_2S_2O_8$ (1:3 mole ratio) in a PTFE-lined 125 ml pressure vessel. The pressure vessel was sealed and heated at 90° C. for 12 hours. The pressure vessel was cooled to room temperature before opening. Solid products were separated from the reaction mixtures by vacuum filtration. The solids were washed with several portions of de-ionized water, collected by vacuum filtration, and dried at about 60° C. for 24 hours in air.

The dried solids were characterized by x-ray powder diffraction. The x-ray powder diffraction patterns were similar to, but not identical to those obtained for the initial $Ag_2BiO_3$ and $Ag_3BiO_3$ phases of Examples 11 and 12, respectively.

Figure 12B:
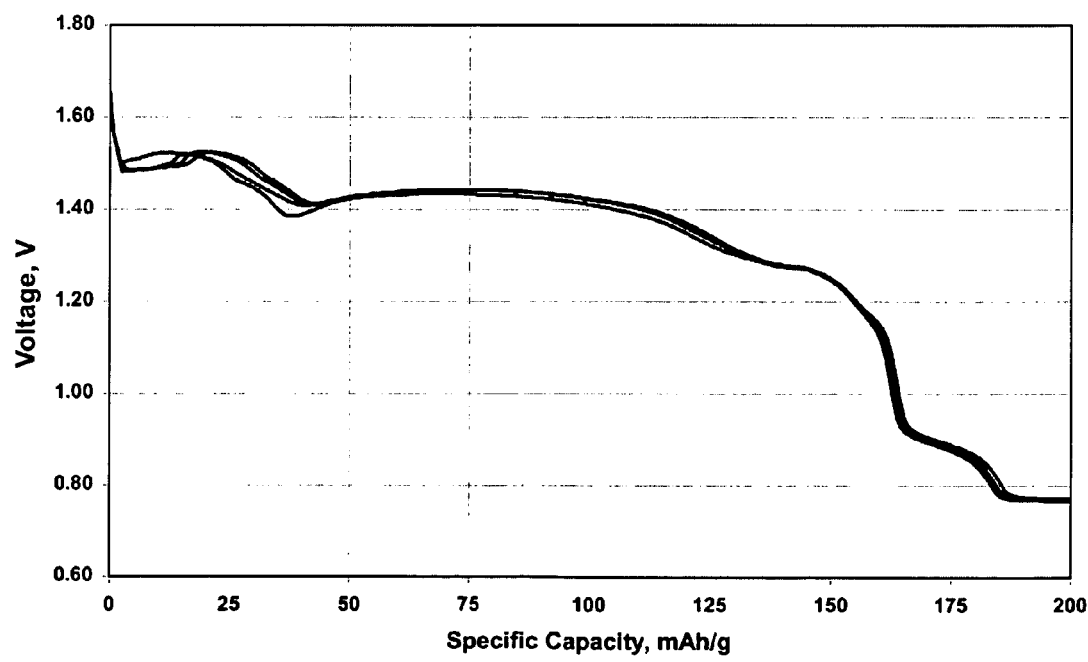
FIG. 12B shows discharge curves for $Ag_3BiO_{3+\delta}$ ($\delta \approx 0.5$) in an alkaline button cell discharged at 10 mA/g to a 0.8 V cutoff voltage.
Figure 13B:
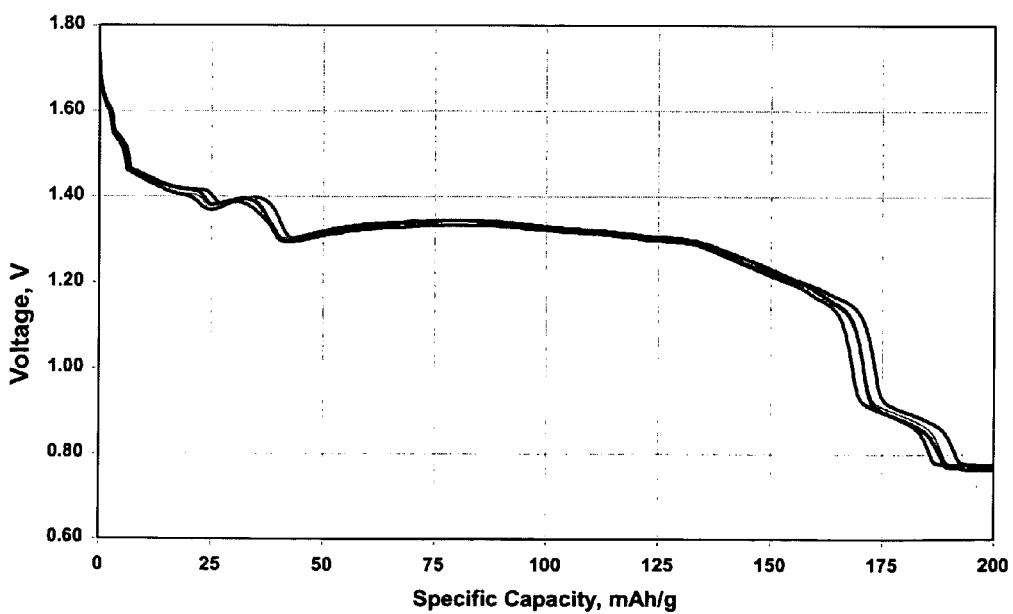
FIG. 13B shows discharge curves for $Ag_2BiO_{3+\delta}$ ($\delta=0.5$) in alkaline button cells discharged at 10 mA/g to a 0.8 V cutoff voltage.

The electrochemical discharge performances of the two oxidized silver bismuthates were evaluated in alkaline button cells. Cathode mixtures were prepared as described for the uncoated cubic-$AgBiO_3$ of Example 5 by mixing 75 wt % of either $Ag_3BiO_{3+\delta}$ (Example 13a) or $Ag_2BiO_{3+\delta}$ (Example 13b), 20 wt % oxidation-resistant, synthetic graphite (e.g., Timrex® SFG-15; Timcal, Ltd., Bodio, Switzerland), and 5 wt % of 9N KOH electrolyte solution with a mortar and pestle. Cells were fabricated in the same general manner as described in Example 2. All the cells were stored for 24 hours at room temperature prior to discharge. Cells were discharged at a constant low rate of 10 mA/g (i.e., C/20) to a cutoff voltage of 0.8 V. Discharge curves for the button cells containing $Ag_3BiO_{3+\delta}$ and $Ag_2BiO_{3+\delta}$ discharged at the low rate are shown in FIG. 12B and FIG. 13B. The average CCV values at the low discharge rate for $Ag_3BiO_{3+\delta}$ of Example 13a and $Ag_2BiO_{3+\delta}$ of Example 13b were about 1.45 V and 1.35 V, respectively. Specific capacity at the low discharge rate for $Ag_2BiO_{3+\delta}$ was about 189 mAh/g which is consistent with a one-electron oxidation of $Ag_2BiO_3$ to $Ag_2BiO_{3.5}$ and corresponds to about 85% of the four-electron theoretical specific capacity of $Ag_2BiO_{3.5}$ of 223 mAh/g given in FIG. 2. Specific capacity at the low discharge rate for $Ag_3BiO_{3+\delta}$ was about 170 mAh/g which is consistent with a one-electron oxidation of $Ag_3BiO_3$ to $Ag_3BiO_{3.5}$ and corresponds to about 93% of the four-electron theoretical capacity of 182 mAh/g given in FIG. 2.

Example 14

Preparation and discharge of silver bismuthate, $Ag_{7+x}BiO_6$: A silver bismuthate phase having the nominal stoichiometry $Ag_{25}Bi_3O_{18}$ (i.e., $Ag_{8.33}BiO_6$) was prepared at ambient pressure under reflux in a 50% KOH aqueous solution as reported by M. Jansen and co-workers (See, for example, Z. Anorg. Allgem. Chem., 628(6), 1951-4 (2002)) as an alternative method to the treatment at high oxygen pressures (e.g., 10 MPa) previously reported by M. Bortz & M. Jansen (See, for example, Z. Anorg. Allgem. Chem., 612(6), 113-7 (1992)).

A silver bismuthate having the nominal composition $Ag_{7+x}BiO_7$ ($0<x<1.33$) was prepared under hydrothermal conditions starting with a mixture of $Bi_2O_3$, cubic-$AgBiO_3$, and $Ag_2O$ in a mole ratio of 1:2:9 (i.e., corresponding to stoichiometric $Ag_{25}Bi_3O_{18}$). Cubic-$AgBiO_3$ was prepared as described in Example 5. A mixture of 0.7 g nanoparticulate $Bi_2O_3$, 0.548 g cubic-$AgBiO_3$, and 4.178 g $Ag_2O$ was blended in an agate mortar. The mixed oxides were added to 80 ml 50% KOH aqueous solution in a PTFE-lined 125 ml pressure vessel. The pressure vessel was sealed, heated to 100° C., and held at temperature for 8 days. The pressure vessel was cooled to room temperature before opening. A solid product was separated from the reaction mixture by vacuum filtration, re-dispersed in several portions of de-ionized water, collected by vacuum filtration, and dried at about 60° C. for 24 hours in air.

The dried solid was characterized by x-ray powder diffraction. The x-ray powder diffraction pattern of the dried solid was consistent with an intermediate phase having a nominal composition of $Ag_{7+x}BiO_6$ rather than the stoichiometric $Ag_{25}Bi_3O_{18}$ phase (See, JCPDS No. 80-2246) reported by M. Jansen and co-workers as the final reaction product (See, for example, Z. Anorg. Allg. Chem., 612(6), 113-7 (1992)).

Figure 14:
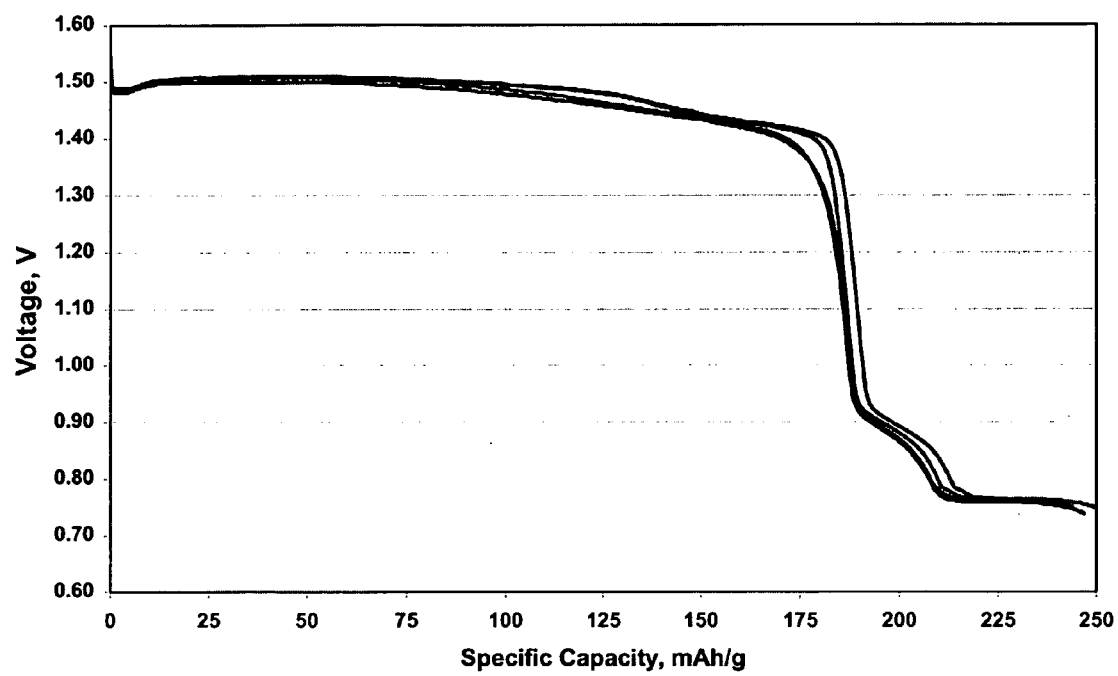
FIG. 14 shows discharge curves for $Ag_{7+x}BiO_6$ ($x \approx 0.5$) in an alkaline button cell discharged at 10 mA/g to a 0.8 V cutoff voltage.

The fresh electrochemical discharge performance of the $Ag_{7+x}BiO_6$ phase was evaluated in alkaline button cells. Cathode mixtures were prepared as described for cubic-$AgBiO_3$ of Example 5 by mixing 75 wt % $Ag_{7+x}BiO_6$, 20 wt % oxidation-resistant, synthetic graphite (e.g., Timrex® SFG-15; Timcal, Ltd., Bodio, Switzerland), and 5 wt % 9N KOH electrolyte solution with a mortar and pestle. Cells were fabricated in the same general manner as described in Example 2. All cells were stored for 24 hours at room temperature prior to discharge. Cells were discharged at a constant low rate of 10 mA/g (i.e., C/20) to a cutoff voltage of 0.8 V. Average OCV was about 1.4 V. A typical discharge curve for button cells containing $Ag_{7+x}BiO_6$ discharged at the low rate is shown in FIG. 14. The average CCV at the low rate was about 1.50 V. Three voltage plateaus were present in the low-rate discharge curve above 0.8 V at nominal voltages of 1.5 V, 1.45 V, and 0.9 V as shown in FIG. 14. Total specific capacity for $Ag_{7+x}BiO_6$ at the low discharge rate was about 213 mAh/g which corresponds to about 93 percent of the theoretical 9-electron capacity of 228 mAh/g for $Ag_7BiO_6$ given in FIG. 2. This capacity value is consistent with about 25% of the bismuth being present as Bi(III) and x equal to about 0.5 for a nominal stoichiometry of $Ag_{7.5}BiO_6$.

All references, such as patent applications, publications, and patents, referred to herein are incorporated by reference in their entirety.

Other embodiments are in the claims.

What is claimed is:

1. A primary battery, comprising:
a cathode comprising particles consisting essentially of electrochemically active bismuth oxide in which at least 50 atomic percent of the bismuth in the bismuth oxide is pentavalent bismuth and, optionally, an electrically conductive coating, the particles having a mean particle size of from about 0.005 to 50 microns and a specific surface area from about 1 to 40 m²/g;
an anode;
a separator between the cathode and the anode; and
an alkaline electrolyte comprising an aqueous alkali metal hydroxide solution.

2. The battery of claim 1, wherein the cathode further comprises a second electrochemically active material.

3. The battery of claim 2, wherein the second electrochemically active material is selected from the group consisting of manganese dioxide, nickel oxyhydroxide, silver oxide, silver nickelate, silver copper oxide, silver permanganate, barium permanganate, barium manganate, and barium ferrate.

4. The battery of claim 2, wherein the second electrochemically active material has a mean particle size of from about 1 micron to 100 microns.

5. The battery of claim 2, wherein the second electrochemically active material has a specific surface area of from about 3 to 50 m²/g.

6. The battery of claim 1, wherein the electrochemically active oxide comprises an alkali metal.

7. The battery of claim 1, wherein the electrochemically active oxide comprises an alkaline earth metal.

8. The battery of claim 1, wherein the electrochemically active oxide comprises a transition metal.

9. The battery of claim 1, wherein the electrochemically active oxide comprises a main group metal.

10. The battery of claim 1, wherein the particles have a mean particle size of from about 0.1 to 15 microns.

11. The battery of claim 1, wherein at least 70% atomic percent of the bismuth in the bismuth oxide is pentavalent bismuth.

12. The battery of claim 1, wherein at least 90% atomic percent of the bismuth in the bismuth oxide is pentavalent bismuth.

13. The battery of claim 1, wherein the bismuth oxide also contains trivalent bismuth.

14. The battery of claim 1, wherein the particles include the electrically conductive coating and the coating comprises a carbonaceous material.

15. The battery of claim 1, wherein the particles include the electrically conductive coating and the coating comprises metal.

16. The battery of claim 1, wherein the particles consist of the bismuth oxide and, optionally, the electrically conductive coating.

* * * * *